(12) United States Patent
Yamashita et al.

(10) Patent No.: US 7,539,751 B2
(45) Date of Patent: *May 26, 2009

(54) MEDIA INFORMATION DISTRIBUTION AND RECORDING SYSTEM, AND APPARATUS AND PROGRAM-RECORDED MEDIUM FOR THE SYSTEM

(75) Inventors: Masami Yamashita, Tottori (JP); Kenji Katsuhara, Tottori (JP)

(73) Assignee: Ricoh Microelectronics, Company, Ltd., Tottori-shi (JP)

( * ) Notice: Subject to any disclaimer, the term of this patent is extended or adjusted under 35 U.S.C. 154(b) by 929 days.

This patent is subject to a terminal disclaimer.

(21) Appl. No.: 11/017,779

(22) Filed: Dec. 22, 2004

(65) Prior Publication Data

US 2005/0137985 A1  Jun. 23, 2005

Related U.S. Application Data

(62) Division of application No. 09/505,435, filed on Feb. 16, 2000, now Pat. No. 6,853,985.

(51) Int. Cl.
*G06F 15/173* (2006.01)

(52) U.S. Cl. .................. 709/224; 709/223; 709/217; 360/55; 360/69; 705/51

(58) Field of Classification Search .................. 709/223, 709/224, 217, 201; 705/51; 360/55, 69
See application file for complete search history.

(56) References Cited

U.S. PATENT DOCUMENTS

| | | | |
|---|---|---|---|
| 5,166,911 A | 11/1992 | Misawa et al. | |
| 5,291,301 A | 3/1994 | Lee | |
| 5,574,239 A | 11/1996 | Kang et al. | |
| 5,592,511 A * | 1/1997 | Schoen et al. | ................ 375/220 |
| 5,963,916 A * | 10/1999 | Kaplan | ........................ 705/26 |
| 6,049,892 A * | 4/2000 | Casagrande et al. | ........... 714/18 |
| 6,226,241 B1 * | 5/2001 | D'Amato et al. | ......... 369/47.15 |
| 6,317,779 B1 * | 11/2001 | Gile et al. | .................... 709/217 |
| 6,446,073 B1 | 9/2002 | D'Amato et al. | |
| 6,487,145 B1 | 11/2002 | Berhan | |
| 6,529,946 B2 * | 3/2003 | Yokono et al. | ............... 709/217 |
| 6,853,985 B1 * | 2/2005 | Yamashita et al. | ............ 705/51 |

FOREIGN PATENT DOCUMENTS

JP  405174446 A  7/1993

OTHER PUBLICATIONS

Unix in a Nutshell, Daniel Gilly, O'reilly & Associates, 1994.

* cited by examiner

*Primary Examiner*—Philip B Tran
(74) *Attorney, Agent, or Firm*—Oblon, Spivak, McClelland, Maier & Neustadt, P.C.

(57) ABSTRACT

A media information distribution and recording system for distributing media information from a central apparatus to terminal apparatus through a network and for recording the media information on a detachable recording medium in the terminal apparatus, wherein the terminal apparatus serves not only as a transmitting terminal apparatus, but also as a receiving terminal apparatus, is proposed, together with the terminal apparatus, a media information recording apparatus for use in this system, and a recording medium which stores a program that controls the operation of a computer for use in this system as well as in the media information recording apparatus.

2 Claims, 31 Drawing Sheets

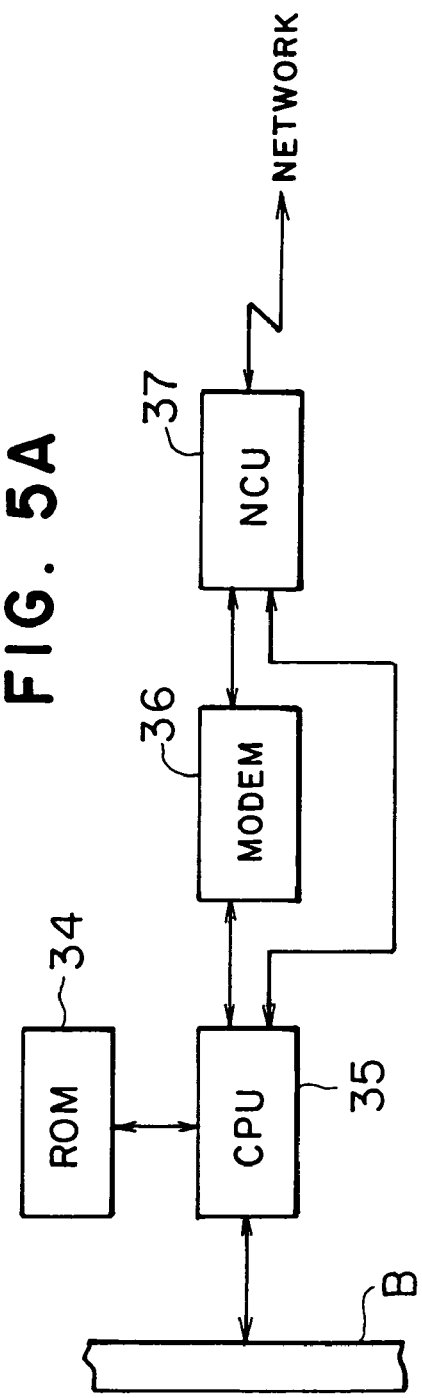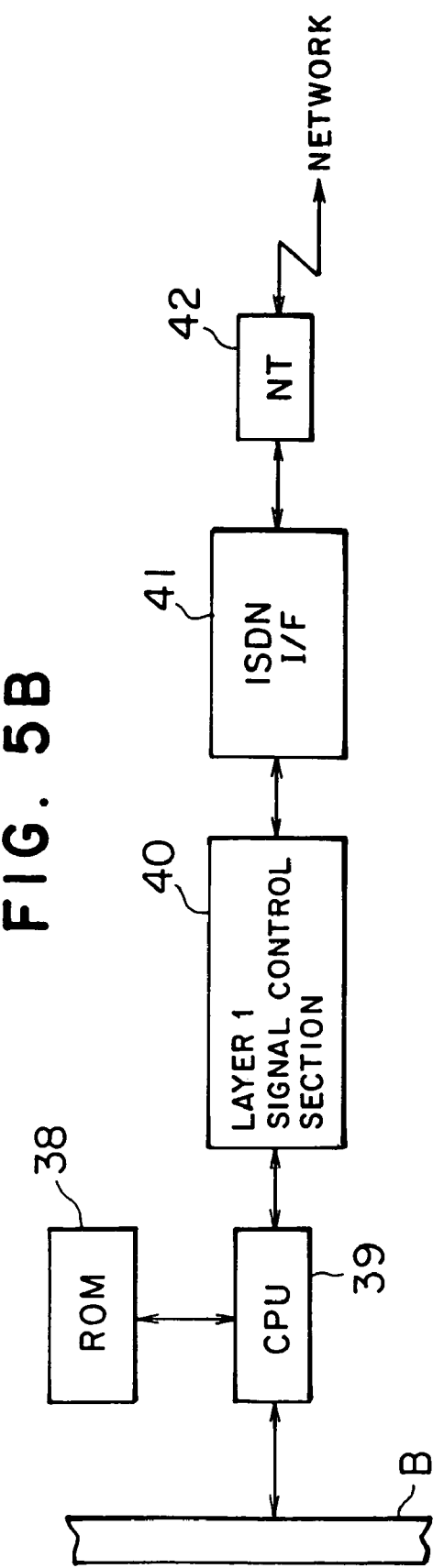

FIG. 8

DEPRESS THE BUTTON FOR THE MEDIA INFORMATION WHICH YOU WISH TO RECORD.

- ( BUTTON 1 ) MUSIC
- ( BUTTON 2 ) BOOKS
- ( BUTTON 3 ) PHOTOGRAPHS
- ( BUTTON 4 ) DRAWINGS
- ( BUTTON 5 ) MAPS

TO RECORD OTHER MEDIA INFORMATION, DEPRESS THE BUTTON IN THE SAME MANNER. OTHERWISE, DEPRESS THE RECORDING INSTRUCTION BUTTON.

[BUTTON] TITLE A    [BUTTON] RETURN TO PREVIOUS MENU

[BUTTON] TITLE B    [RECORDING INSTRUCTIONS]

FIG. 10

| RECEIPT CODE | MEDIA INFORMATION TO BE RECORDED | EXPECTED RECORDING COMPLETION TIME |
|---|---|---|
| 000 | | |
| 000 | | |
| 021 | 1815, 2633, 2290 | 10:25, 17th |
| 022 | 4611, 5327, | 10:56, 17th |
| 023 | 3026, 3819, 3347, 3562 | 11:37, 17th |

FIG. 11

| MEDIA CODE | TITLE | DATA SIZE | |
|---|---|---|---|
| 0001 | TITLE D | D1 | |
| 0002 | TITLE E | D2 | |
| 0003 | TITLE F | D3 | |
| 0004 | TITLE G | D4 | |

FIG. 12

RECEIPT CODE      023

EXPECTED RECORDING COMPLETION TIME:      17th, 11:37

| MEDIA CODE | TITLE | DATA SIZE | REGISTRATION DATE | NUMBER OF RECORDINGS A (PAST WEEK) | NUMBER OF RECORDINGS B (PRESENT WEEK) | TOTAL NUMBER OF RECORDINGS A+B |
|---|---|---|---|---|---|---|
| 0003 | TITLE F | D3 | 96.1.12 | 35 | 5 | 40 |
| 0005 | TITLE B | D5 | 96.3.15 | 27 | 12 | 39 |
| 0012 | TITLE H | D6 | 96.6.3 | 22 | 25 | 47 |

FIG. 15

| RECORDING UNIT CODE | CARTRIDGE | SHELF |
|---|---|---|
| D1 | A | 10 |
| D2 | A | 11 |

FIG. 16

| No. | CARTRIDGE | SHELF | STATUS OF CD |
|---|---|---|---|
| 1 | A | 1 | VACANT |
| 2 | A | 2 | VACANT |
| 3 | A | 3 | VACANT |
| 4 | A | 4 | VACANT |
| 5 | A | 5 | RECEIPT CODE J1 |
| 6 | A | 6 | VACANT |
| 7 | A | 7 | RECEIPT CODE J3 |
| 8 | A | 8 | RECEIPT CODE J4 |
| 9 | A | 9 | VACANT |
| 10 | A | 10 | RECORDING UNIT D1 |
| . | . | . | . |
| . | . | . | . |
| . | . | . | . |
| 198 | D | 48 | BLANK CD |
| 199 | D | 49 | BLANK CD |
| 200 | D | 50 | BLANK CD |

FIG. 17

| RECEIPT CODE | CARTRIDGE | SHELF | CUSTOMER'S RECEIPT |
|---|---|---|---|
| . | . | . | . |
| . | . | . | . |
| . | . | . | . |
| J1 | A | 5 | NOT YET RECEIVED |
| J2 | A | 6 | RECEIVED |
| J3 | A | 7 | NOT YET RECEIVED |
| J4 | A | 8 | NOT YET RECEIVED |
| J5 | B | 24 | RECEIVED |
| J6 | B | 36 | NOT YET RECEIVED |
| . | . | . | . |
| . | . | . | . |
| . | . | . | . |

FIG. 20

TO RECORD OTHER MEDIA INFORMATION, DEPRESS THE BUTTON IN THE SAME MANNER. OTHERWISE, DEPRESS THE RECORDING INSTRUCTION BUTTON OR THE REMOTE RECORDING INSTRUCTION BUTTON.

| BUTTON | TITLE A |
| BUTTON | TITLE B |

BUTTON — RETURN TO PREVIOUS MENU

RECORDING INSTRUCTIONS

REMOTE RECORDING INSTRUCTIONS

FIG. 21

PLEASE INPUT AN ID CODE FOR RECEIVING TERMINAL APPARATUS.

TO RECORD OTHER MEDIA INFORMATION, DEPRESS THE BUTTON IN THE SAME MANNER. OTHERWISE, DEPRESS THE RECORDING INSTRUCTION BUTTON OR THE REMOTE RECORDING INSTRUCTION BUTTON.

[BUTTON] TITLE A     [BUTTON] RETURN TO PREVIOUS MENU

[BUTTON] TITLE B     [RECORDING INSTRUCTIONS]

· · ·

TO AUDITION, DEPRESS THE AUDITION BUTTON

[AUDITION] [CANCEL]

FIG. 40

| MEDIA CODE | TITLE | DATA SIZE | COST |
|---|---|---|---|
| 0001 | TITLE D | D1 | A1 |
| 0002 | TITLE E | D2 | A2 |
| 0003 | TITLE F | D3 | A3 |
| 0004 | TITLE G | D4 | A4 |

FIG. 41

BILL

RECEIPT CODE 023

SEPTEMBER 10, 1997

AMOUNT:  ¥ _____ .

| TITLE | AMOUNT |
|---|---|
| TITLE E | ¥ |
| TITLE H | ¥ |
| TITLE B | ¥ |
| . | . |
| . | . |
| TOTAL | ¥ _____ . |

MEDIA INFORMATION DISTRIBUTION AND RECORDING SYSTEM, AND APPARATUS AND PROGRAM-RECORDED MEDIUM FOR THE SYSTEM

CROSS-REFERENCE TO RELATED APPLICATIONS

The present patent document is a Divisional of U.S. application Ser. No. 09/505,435 filed on Feb. 16, 2000, the entire contents of each of which are hereby incorporated herein by reference.

BACKGROUND OF THE INVENTION

1. Field of the Invention

The present invention relates to a media information distribution and recording system for distributing media information to be recorded from a central apparatus which stores an information source for the media information to be recorded by a media information recording apparatus which serves as terminal apparatus through a network.

The present invention also relates to a media information recording apparatus for use in the above-mentioned media information distribution and recording system, for recording media information such as musical compositions on detachable recording media such as WORM-type compact discs (Write Once Read Many type compact discs) in accordance with the customer' preference to make his or her personal CDs.

The present invention also relates to a recording medium which stores a program that controls the operation of a computer for the above-mentioned media information distribution and recording system and media information recording apparatus for use in the media information distribution and recording system.

2. Discussion of Background

Currently, music information is on the market in the form of recording media such as compact discs and recording tapes on which music information is recorded. On such recording media, preset music information is recorded so that it is not always easy for the customer to purchase, for instance, a single CD on which a plurality of his or her desired different music information items only is recorded. Therefore if a customer wishes to have his or her own recording medium on which his or her desired music information items only is recorded, the customer will have to selectively record the desired music information items on another recording media on his or her own responsibility.

It was previously reported in the morning edition of the Asahi (Japanese Newspaper) of May 14, 1993 that in the United States, there was being developed a system in which music information to be recorded on CDs can be transmitted through a telecommunications network to shops for retailing CDs, and automatic CD vending machines at the shops can record the customer's desired music on CDs on the spot in accordance with the customer's request, after which the CDs are sold.

The customer can use a credit card for the automatic CD vending machines, can select the desired music to be recorded, and can have the selected music recorded on blank CDs on the spot in accordance with guidance provided on the automatic CD vending machines.

Japanese Laid-Open Patent Application 6-350729 discloses a data base utilizing system as shown in FIG. 26. In this system, a customer's terminal apparatus 73 is configured to communicate with a music service center's apparatus 72 through an ISDN (Integrated Services Digital Network) 71. The music service center's apparatus 72 comprises a digital synchronous unit, a searchable data base 75 and a computer 74, and the customer's terminal apparatus 73 comprises a digital synchronous unit, a computer 76, a CD write-in unit 77. At the request of the customer, the customer's terminal apparatus 73 is connected with the music service center's apparatus 72 and receives a menu with a layered structure from the music service center's apparatus 72. The customer chooses the desired information from the menu, and a request for information about the choice is transmitted to the music service center's apparatus 72. In the music service center's apparatus 72, the desired information is searched from the data base 75 in accordance with the request, and the searched information is transmitted to the customer's terminal apparatus 73. Within the ISDN 71, there is provided a charging unit 78 for determining a charge for the service to be paid by the customer, with the kind and time of the service taken into consideration.

Japanese Laid-Open Patent Application 7-297949 discloses a media information distribution system as shown in FIG. 27. This media information distribution system is configured in such a manner that a central apparatus 82 and terminal apparatus 83 are interconnected through a communication line 81 and can communicate with one other. The central apparatus 82 codes media information to be transmitted and transmits the coded media information to the terminal apparatus 83. The terminal apparatus 83 then re-codes the coded media information whenever the media information is recorded in a recording medium 84, whereby the copyright of the media information is securely protected.

Japanese Laid-Open Patent Application 7-297950 discloses a media information distribution system as shown in FIG. 28. This media information distribution system is configured in such a manner that a central apparatus 82 and terminal apparatus 83 are interconnected through a communication line 81 and can communicate with one other. The terminal apparatus 83 receives media information to be recorded from the central apparatus 82 and stores the received media information in storage means 85. Whenever the received media information is recorded in a recording medium 84, the terminal apparatus 83 must obtain permission from the central apparatus 82 to record the received media information on the recording medium 84 by transmitting file control information to the central apparatus 82 prior to recording the received media information, whereby the copyright of the media information is securely protected.

The above-mentioned conventional systems, however, have the shortcoming that it takes a long time before the recording of the requested media information is completed, so that the customer does not always feel happy about the system.

Furthermore, the above-mentioned conventional systems have the shortcoming that media information to be recorded, for instance, a number of musical compositions, cannot be quickly designated, since each musical composition has to be designated separately by specifying the titles one by one. Furthermore, there is the risk that excess designation for recording will be made, so that the data size for the media information to be recorded exceeds the capacity of the recording medium for the media information to be recorded.

In addition, the above-mentioned conventional systems have the following shortcomings. Specifically, when the customer does not have exact particulars about the media information to be recorded, for instance, the correct title of a musical composition, not even an audition can be carried out. In the case where musical compositions are recorded on recording media, titles and words cannot be printed either on labels or on the recording media themselves. No additional recording can be made on the customer's recording medium.

In any of the above-mentioned conventional systems, payment on the spot or cash payment for the recording service cannot be made. Recently a payment system using credit cards, and a payment system through a network as disclosed in Japanese Laid-Open Patent Application 6-350729 are reported but are not yet popular, and are not always suitable for minor-aged customers and customers who do not have credit cards.

Furthermore, the above-mentioned conventional systems are not provided with a unit for collecting data and/or information for improving the systems themselves in the course of providing the customer with various services.

SUMMARY OF THE INVENTION

It is therefore a first object of the present invention to provide a media information distribution and recording system for distributing media information from a central apparatus to terminal apparatus through a network and for recording the media information on a detachable recording medium in the terminal apparatus, wherein the terminal apparatus serves not only as a transmitting terminal apparatus, but also as a receiving terminal apparatus, from which the above-mentioned conventional shortcomings have been eliminated, and, in particular, the first object is to provide a media information distribution and recording system for which it is unnecessary to wait for a long time near the terminal apparatus before the recording of the media information is completed, in which a plurality of different media formation items can be easily designated, can be easily auditioned for critical listening before recording the media information, additional information such as titles and words can be printed on a label or a sheet, or directly on the detachable recording medium, the media information can be additionally recorded on the customer's recording medium, payment for the recording services can be made on the spot, in cash, or control data for improvement of the system can be collected and analyzed.

A second object of the present invention is to provide a media information recording apparatus which serves as the terminal apparatus for use in the above-mentioned media information distribution and recording system.

A third object of the present invention is to provide a recording medium which stores a program that controls a computer for use in either the media information distribution and recording system for distributing media or the media information recording apparatus.

The first object of the present invention can be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording instruction means for designating specified media information to be recorded on the detachable recording medium and providing recording instructions concerning the recording of the designated specified media information, recording completion time estimation means for estimating an expected recording completion time which indicates the time at which the recording of the designated specified media information is expected to be completed, upon the issuance of instructions to record the designated specified media information being instructed, expected recording completion time indication means for indicating the expected recording completion time, media information downloading means for downloading the designated specified media information from the central apparatus to the terminal apparatus, and media information recording means for recording on the recording medium the designated specified media information downloaded by the media information downloading means.

In the above media information distribution and recording system, the terminal apparatus may further comprise media information storage means for storing the designated specified media information, and the media information downloading means can be configured to download the designated specified media information either from the central apparatus or from the media information storage means.

In the above media information distribution and recording system, the recording instruction means may be configured to designate succeeding specified media information to be recorded prior to the completion of the recording of preceding specified media information that has already been designated to be recorded.

In the above media information distribution and recording system, the recording instruction means may comprise a plurality of recording operation instruction units, each of which is independently configured to designate specified media information to be recorded and issuing instructions for the recording of the designated specified media information on a different recording medium.

In the above media information distribution and recording system, the recording instruction means may comprise a plurality of recording operation instruction units, each of which is independently configured to designate specified media information to be recorded and to issue instructions for the recording of the designated specified media information on a different recording medium, and the expected recording completion time indication means comprises expected recording completion time indication display means, each of which expected recording completion time indication display means displays the expected recording completion time for each of the recording operation instruction units.

In the above media information distribution and recording system, the terminal apparatus may further comprise receipt code indication means for indicating a receipt code for each instruction upon the issuance of instructions to record the designated specified media information.

In the above, the receipt code indication means may comprise (1) ticket issuing means for issuing a ticket in which the receipt code is indicated, (2) display means for displaying the receipt code, (3) acoustic wave or voice outputting means for outputting an acoustic wave or a voice indicating the receipt code, or at least two of the ticket issuing means, the display means and the acoustic wave or voice outputting means in combination.

In the above, the expected recording completion time indication means may also comprise (1) ticket issuing means for issuing a ticket in which the expected recording completion time is indicated, (2) display means for displaying the expected recording completion time, (3) acoustic wave or voice outputting means for outputting an acoustic wave or a voice indicating the expected recording completion time, or at least two of the ticket issuing means, the display means and the acoustic wave or voice outputting means in combination.

In the above media information distribution and recording system, the terminal apparatus may further comprise (1)

ticket issuing means for issuing a ticket in which the expected recording completion time, and/or a receipt code for each instruction, upon the issuance of instructions to record the designated specified media information, (2) display means for displaying the expected recording completion time, and/ or a receipt code for each instruction, upon the issuance of instructions to record the designated specified media information, (3) acoustic wave or voice outputting means for outputting an acoustic wave or a voice indicating the expected recording completion time, and/or a receipt code for each instruction, upon the issuance of instructions to record the designated specified media information, or at least two of the ticket issuing means, the display means and the acoustic wave or voice outputting means in combination.

In the above media information distribution and recording system, the terminal apparatus may further comprises acoustic wave or voice outputting means for outputting an acoustic wave or a voice indicating the completion of recording of the designated specified media information.

In the above media information distribution and recording system, the terminal apparatus can serve as the transmitting terminal apparatus, and the recording instruction means thereof is configured to designate a receiving terminal apparatus to which the specified media information to be recorded is to be downloaded, and the terminal apparatus further comprises:

(a) inter-terminal communication means for transferring the recording instructions to the receiving terminal apparatus so that the designated specified media information can be downloaded to the receiving terminal apparatus, and for acquiring from the receiving terminal apparatus at least a receipt code for the recording instructions transferred, and (b) remote receipt code indication means for indicating that the receipt code has been acquired from the receiving terminal apparatus.

In the above media information distribution and recording system, the terminal apparatus can also serve as the receiving terminal apparatus, and comprise remote instruction receiving means for receiving the recording instructions from other terminal apparatus serving as the transmitting terminal apparatus, and also for transmitting at least a receipt code for the recording instructions to the other terminal apparatus serving as the transmitting terminal apparatus.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording instruction means for designating specified media information to be recorded on the detachable recording medium and providing recording instructions concerning the recording of the designated specified media information, which recording instructions include a recording completion time at which the recording of the designated specified media information is to be completed, booking means for booking the recording completion time provided by the recording instruction means, monitoring means for monitoring whether or not there is detected record idling time free of any recording operation to be conducted before a predetermined time prior to the recording completion time booked by the booking means is reached, and also for monitoring whether or not the predetermined time has been reached, media information downloading means for downloading the designated specified media information from the central apparatus to the terminal apparatus, and media information recording means for recording on the detachable recording medium the designated specified media information downloaded by the media information downloading means when the record idling time has been detected by the monitoring means or when the predetermined time has been reached.

In the above media information distribution and recording system, the terminal apparatus may further comprise media information storage means for storing the designated specified media information, and the media information downloading means is configured to download the designated specified media information either from the central apparatus or from the media information storage means.

In the above, the booking means can be configured to make judgment on the feasibility of recording the specified media information by the recording completion time, when the booking of the recording completion time is requested through the booking means, and is also configured to indicate whether or not the booking can be accepted, based on the judgment made.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

remote receiving and transmitting means for receiving recording instructions concerning the recording of specified media information to be recorded, which recording instructions are transmitted to the terminal apparatus from a remote information transmitting equipment through a network, and transmitting back to the remote information transmitting equipment an expected recording completion time at which the recording of the specified media information is expected to be completed, and/or a receipt code for the recording instructions, recording completion time estimation means for estimating the expected recording completion time when the remote receiving and transmitting means has received the recording instructions, media information downloading means for downloading the specified media information from the central apparatus to the terminal apparatus, and media information recording means for recording on the recording medium the designated specified media information downloaded by the media information downloading means.

In the above media information distribution and recording system, the terminal apparatus may further comprises media information storage means for storing the specified media information, and the media information downloading means is configured to download the designated specified media information either from the central apparatus or from the media information storage means.

Furthermore, in the above media information distribution and recording system, the remote information transmitting equipment may comprise a telephone.

In the above media information distribution and recording system, the terminal apparatus may further comprise:

recording media holding and loading means which is configured to hold a plurality of recording media capable of recording therein media information, and to load the recording media successively into the media information recording means when the recording of the designated specified media information is instructed.

In the above, the terminal apparatus may further comprise:

recording media holding display means which is configured to display the number of the recording media held in the recording media holding and loading means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

remote booking receiving means for receiving recording instructions concerning the recording of specified media information to be recorded, including a recording completion booking time by which the recording of the specified media information is to be completed, which recording instructions are transmitted to the terminal apparatus from a remote information transmitting equipment through a network, and transmitting back to the remote information transmitting equipment a booking feasibility information indicating whether or not the recording completion booking time is acceptable, and/or a receipt code for the recording instructions, monitoring means for monitoring whether or not there is detected record idling time free of any recording operation to be conducted before a predetermined time prior to the recording completion booking time, and also for monitoring whether or not the predetermined time has been reached, media information downloading means for downloading the specified media information from the central apparatus to the terminal apparatus, and media information recording means for recording on the recording medium the designated specified media information downloaded by the media information downloading means when the record idling time has been detected by the monitoring means or when the predetermined time has been reached.

In the above media information distribution and recording system, the terminal apparatus may further comprise media information storage means for storing the specified media information, and the media information downloading means is configured to download the specified media information either from the central apparatus or from the media information storage means.

In the above media information distribution and recording system, the terminal apparatus may further comprise display means which is configured to display a receipt code of the media information for which recording has been completed, and/or a receipt code of the media information for which recording is being conducted.

In the above media information distribution and recording system, the terminal apparatus may further comprises:

recording media holding means which is configured to hold therein recording media in each of which the specified media information has been recorded, with a receipt code being assigned to the respective recording media, and recording medium ejection means which is configured to eject each of the recorded recording media from the recording media holding means when the recording of the specified media information corresponding to the receipt code thereof has been completed and ejection instructions are input together with the receipt code.

In the above, the terminal apparatus may further comprises receipt code read-out means which is configured to read out a receipt code.

In the above media information distribution and recording system, the terminal apparatus may further comprise:

recording media holding and loading means which is configured to hold a plurality of recording media capable of recording therein media information, and to load the recording media successively into the media information recording means when the recording of the designated specified media information is instructed.

In the above, the terminal apparatus further comprises:

recording media holding display means which is configured to display the number of the recording media held in the recording media holding and loading means.

The second object of the present invention can be achieved by an apparatus comprising:

recording instruction means for designating specified media information to be recorded on the detachable recording medium and providing recording instructions concerning the recording of the designated specified media information, recording completion time estimation means for estimating an expected recording completion time which indicates the time at which the recording of the designated specified media information is expected to be completed, upon the issuance of instructions to record the designated specified media information, and expected recording completion time indication means for indicating the expected recording completion time.

The above apparatus may further comprise media information storage means for storing the designated specified media information, and the media information downloading means is configured to download the designated specified media information either from the central apparatus or from the media information storage means.

The second object of the present invention can also be achieved by an apparatus comprising:

recording instruction means for designating specified media information to be recorded on the detachable recording medium and providing recording instructions concerning the recording of the designated specified media information, recording completion time estimation means for estimating an expected recording completion time which indicates the time at which the recording of the designated specified media information is expected to be completed, upon the issuance of instructions to record the designated specified media information, expected recording completion time indication means for indicating the expected recording completion time, media information downloading means for downloading the designated specified media information from the central apparatus to the terminal apparatus, and media information recording means for recording on the recording medium the designated specified media information downloaded by the media information downloading means.

The second object of the present invention can also be achieved by an apparatus comprising:

recording instruction means for designating specified media information to be recorded on the detachable recording medium and providing recording instructions concerning the recording of the designated specified media information, which recording instructions include a recording completion time at which the recording of the designated specified media information is to be completed, booking means for booking the recording completion time provided by the recording instruction means, monitoring means for monitoring whether or not there is detected record idling time free of any recording operation to be conducted before a predetermined time prior to the recording completion time booked by the booking means is reached, and also for monitoring whether or not the predetermined time has been reached, media information downloading means for downloading the designated specified media information from the central apparatus to the terminal apparatus, and media information recording means for recording on the detachable recording medium the designated specified media information downloaded by the media information downloading means when the record idling time has been detected by the monitoring means or when the predetermined time has been reached.

The above apparatus may further comprise media information storage means for storing the designated specified media information, and the media information downloading means is configured to download the designated specified media information either from the central apparatus or from the media information storage means.

The second object of the present invention can also be achieved by an apparatus comprising:

remote receiving and transmitting means for receiving recording instructions concerning the recording of specified media information to be recorded, which recording instructions are transmitted to the terminal apparatus from a remote information transmitting equipment through a network, and transmitting back to the remote information transmitting equipment an expected recording completion time at which the recording of the specified media information is expected to be completed, and/or a receipt code for the recording instructions, recording completion time estimation means for estimating the expected recording completion time when the remote receiving and transmitting means has received the recording instructions, media information downloading means for downloading the specified media information from the central apparatus to the terminal apparatus, and media information recording means for recording on the recording medium the designated specified media information downloaded by the media information downloading means.

The above apparatus may further comprise media information storage means for storing the designated specified media information, and the media information downloading means is configured to download the designated specified media information either from the central apparatus or from the media information storage means.

The third object of the present invention can be achieved by a medium storing a program that controls the operations of a computer in an apparatus for use in a media information distribution and recording system for distributing media information from a central apparatus to terminal apparatus and for recording the media information on a detachable recording medium in the terminal apparatus, in such a manner that information input means for designating specified media information to be recorded on the detachable recording medium and providing recording instructions concerning the recording of the designated specified media information is used, and an expected recording completion time which indicates the time at which the recording of the designated specified media information is expected to be completed is determined, upon the issuance of instructions to record the designated specified media information, and the expected recording completion time is indicated by expected recording completion time indication means for indicating the expected recording completion time.

The third object of the present invention can also be achieved by a medium storing a program that controls the operations of a computer in an apparatus for use in a media information distribution and recording system for distributing media information from a central apparatus to terminal apparatus and for recording the media information on a detachable recording medium in the terminal apparatus, in such a manner that there is used information input means for designating specified media information to be recorded on the detachable recording medium and providing recording instructions concerning the recording of the designated specified media information, and for booking a recording completion time by which the recording of the specified media information designated is to be completed, and recording means for the system is monitored with respect to whether or not there is detected record idling time in which no recording operation is to be conducted by a predetermined time before the recording completion time booked by the booking means is reached, and also with respect to whether or not the predetermined time has been reached, and when the record idling time has been detected, or when the predetermined time has been reached, the designated specified media information is recorded on the recording medium by the recording means.

The third object of the present invention can also be achieved by a medium carrying thereon a program that controls the operations of a computer in an apparatus for use in a media information distribution and recording system for distributing media information from a central apparatus to terminal apparatus and for recording the media information on a detachable recording medium in the terminal apparatus, in such a manner that (1) there is received by receiving means receiving recording instructions concerning the recording of specified media information to be recorded, which recording instructions are transmitted to the terminal apparatus from a remote information transmitting equipment, (2) there is determined an expected recording completion time at which the recording of the specified media information is expected to be completed, upon the recording instructions being received, and there is transmitted by transmitting means the expected recording completion time and/or a receipt number for the recording instructions back to the remote information transmitting equipment.

The third object of the present invention can also be achieved by a medium carrying thereon a program that controls the operations of a computer in an apparatus for use in a media information distribution and recording system for distributing media information from a central apparatus to terminal apparatus and for recording the media information on a detachable recording medium in the terminal apparatus, in such a manner that there are received by receiving means (a) receiving recording instructions concerning the recording of specified media information to be recorded and (b) a recording completion booking time by which the recording of the specified media information designated is to be completed by booking, which recording instructions and recording completion booking time are transmitted to the terminal apparatus from a remote information transmitting equipment, there are transmitted by transmitting means booking acceptance or non-acceptance information which indicates whether or not the booking can be accepted, and/or a receipt number for the recording instructions back to the remote information transmitting equipment, there is monitored whether or not there is detected record idling time in which no recording operation is to be conducted by a predetermined time before the recording completion booking time, and also monitored whether or not the predetermined time has been reached, and there is recorded on the recording medium the designated specified media information when the record idling time has been detected or when the predetermined time has been reached.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording instruction means for displaying a media information menu for designating media information to be recorded, the media information menu containing at least one group of media information, each group containing at least one set of media information data, and for designating at least one group of media information to be recorded on the detachable recording medium, media information downloading means for downloading the designated group of media information from the central apparatus to the terminal apparatus, and media information recording means for recording on the recording medium the designated group of media information downloaded by the media information downloading means.

In the above media information distribution and recording system, the terminal apparatus may further comprise media information storage means for storing the designated group of media information, and the media information downloading means is configured to download the designated group of media information either from the central apparatus or from the media information storage means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording control data storing means for storing data for controlling the recording of each of the media information, and recording control data display means for displaying the data stored by the recording control data storing means.

In the above media information distribution and recording system, the recording control data display means is configured to display the data in the form of a list of media information, and the above media information distribution and recording system further comprises recording instruction means for recording at least one media information selected from the list displayed.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording data size calculation means for calculating a total recording data size of a plurality of media information to be recorded, upon the issuance of instructions to record the plurality of media information, to see whether or not the total recording data size of the media information to be recorded exceeds an effective recording capacity of one recording medium, and information service means for providing a notice to the effect that such exceeding is detected, when the exceeding is found by the calculation conducted by the recording data size calculation means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

audition instructing means for designating media information to be auditioned, and providing audition instructions for auditioning thereof, and reproduction means for reproducing at least part of the media information designated in accordance with the audition instructions.

In the above media information distribution and recording system, the terminal apparatus may further comprise reproduction canceling means for canceling the reproduction of the media information designated in the course of the reproduction thereof.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

additional information outputting means for outputting label information or words for the recording medium in which the media information is recorded.

In the above media information distribution and recording system, the terminal apparatus may further comprise label printing means for printing label information on the surface of the recording medium.

Furthermore, the above terminal apparatus may further comprise label printing means for printing label information on a label sheet.

Furthermore, the above terminal apparatus may further comprise words printing means for printing words on a sheet.

Furthermore, the above terminal apparatus may further comprise additional information recording means for recording the label information or the words on the recording medium.

Furthermore, the above terminal apparatus may further comprise:

image data receiving means for receiving image data, and label information addition means for adding the image data received by the image data receiving means to the label information or to the words.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

media information recording means for recording the media information on the recording medium, recording media holding and loading means for holding a plurality of detachable recording media for recording media information therein and loading the recording media successively into the media information recording means when the recording of the media information is conducted, and additional recording medium supplying means for supplying additional recording media to the recording media holding and loading means, with provision of the respective receipt codes thereof, whereby the media information is recorded with the respective receipt codes thereof in the additional recording media by the media information recording means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording number counting means for counting the number of recordings of each of the media information, and recording number transmitting means for transmitting the number of recordings counted by the recording number counting means to the central apparatus in such a manner that the number of recordings counted is made to correspond to a recording code of each of the media information counted, and wherein the central apparatus comprises:

recording number totaling means for totaling the number of recordings counted by recording number counting means and transmitted by the recording number transmitting means in each of the terminal apparatus to the central apparatus.

In any of the above media information distribution and recording system, the terminal apparatus may further comprise:

marketing data analyzing means for statically analyzing the recording control data.

In any of the above media information distribution and recording system, each terminal apparatus may further comprises:

terminal recording data analyzing means for statically analyzing the number of recordings in each of the terminal apparatus, and the central apparatus further comprises:

center recording data analyzing means for statistically analyzing the number of recordings in each of the terminal apparatus and/or the number of recordings totaled.

In any of the above media information distribution and recording system, the terminal apparatus may further comprise:

marketing data display means for displaying the recording control data and/or the results of the recording control data analyzed.

In any of the above media information distribution and recording system, each terminal apparatus may further comprise:

terminal recording data display means for displaying the number of recordings in each of the terminal apparatus, and/or the results of the number of recordings analyzed, and the central apparatus further comprises:

center recording data display means for displaying the number of recordings in each of the terminal apparatus and/or the number of recordings totaled, and the results of the number of recordings and/or the totaled number of recordings analyzed.

The second object of the present invention can also be achieved by a media information recording apparatus for recording media information in a recording medium, comprising:

recording instruction means for displaying a media information menu for designating media information to be recorded, the media information menu containing at least one group of media information, each group containing at least one set of media information data, and for designating at least one group of media information to be recorded on the detachable recording medium, and media information recording means for recording on the recording medium the designated group of media information.

The second object of the present invention can also be achieved by a media information recording apparatus for recording media information in a recording medium, comprising:

recording number counting means for counting the number of recordings of each of the media information, and media information name display means for displaying the number of recordings counted by the recording number counting means and also for displaying the name of each of the media information counted in a corresponding manner thereto.

The second object of the present invention can also be achieved by a media information recording apparatus for recording media information on a detachable recording medium, comprising:

recording data size calculation means for calculating a total recording data size of a plurality of media information to be recorded, upon the issuance of instructions to record the plurality of media information, to see whether or not the total recording data size of the media information to be recorded exceeds an effective recording capacity of one recording medium, and information service means for providing a notice to the effect that such exceeding is detected, when the exceeding is found by the calculation conducted by the recording data size calculation means.

The second object of the present invention can also be achieved by an apparatus for use in a media information recording system for recording media information in a recording medium, comprising:

audition instructing means for designating media information to be auditioned, and providing audition instructions for auditioning thereof, and reproduction means for reproducing at least part of the media information designated in accordance with the audition instructions by the audition instructing means.

The second object of the present invention can also be achieved by a media information recording apparatus for recording media information on a detachable recording medium, comprising:

additional information outputting means for outputting label information or words for the recording medium in which the media information is recorded.

The second object of the present invention can also be achieved by a media information recording apparatus for recording media information on a detachable recording medium, comprising:

media information recording means for recording the media information on the recording medium, recording media holding and loading means for holding a plurality of detachable recording media for recording media information therein and loading the recording media successively into the media information recording means when the recording of the media information is instructed, and additional recording medium supplying means for supplying additional recording media to the recording media holding and loading means, with provision of the respective receipt codes thereof, whereby the media information is recorded with the respective receipt codes thereof in the additional recording media by the media information recording means.

The third object of the present invention can also be achieved by a recording medium storing a program that controls the operation of a computer in such a manner that a media information menu for designating medium information to be recorded is displayed in display means, the media information menu containing at least one group of media information, each group containing at least one set of media information data, and the designation by input means of at least one group of media information to be recorded is accepted.

The third object of the present invention can also be achieved by a recording medium storing a program that controls the operation of a computer in such a manner that the name of each of media information that can be recorded, and the number of recordings of each of the media information are displayed in a corresponding manner.

The third object of the present invention can also be achieved by a recording medium storing a program that controls the operation of a computer in such a manner that a total recording data size of a plurality of media information to be recorded is calculated and determined, upon the issuance of instructions to record the plurality of media information, to see whether or not the total recording data size of the media information to be recorded exceeds an effective recording capacity of one recording medium, and when the exceeding is detected, a notice to such effect is provided.

The third object of the present invention can also be achieved by a recording medium storing a program that controls the operation of a computer in such a manner that media information to be auditioned is designated with the provision of audition instructions for the auditioning thereof, and when the audition instructions are accepted, and at least part of the media information designated is output in accordance with the audition instructions.

The third object of the present invention can also be achieved by a recording medium storing a program that controls the operation of a computer in such a manner that label information or words are output for a recording medium in which a designated media information is recorded.

The third object of the present invention can also be achieved by a recording medium storing a program that controls the operation of a computer in such a manner that when media information is recorded, a plurality of detachable recording media held for recording media information therein is successively loaded into recording means, and when additional recording media for recording are supplied, a receipt number is assigned to each of the additional recording media, and a designated media information is recorded in the additional recording medium with the assigned receipt number.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording instruction means for designating specified media information to be recorded on the detachable recording medium and providing recording instructions concerning the recording of the designated specified media information, receipt code indication means for indicating a receipt code in accordance with the recording instructions provided, charging amount calculation means for calculating the amount of charge based on the recording instructions provided by the recording instruction means, and charging amount indication means for indicating the amount of the charge.

In the above media information distribution and recording system, the charging amount indication means may comprise (1) bill issuing means for issuing a bill in which the amount of the charge is indicated, (2) display means for displaying the amount of the charge, (3) acoustic wave or voice outputting means for outputting an acoustic wave or a voice indicating the amount of the charge, or at least two of the bill issuing means, the display means, the acoustic wave or voice outputting means in combination.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording medium number counting means for counting the number of recording media used for recording.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

operation time measuring means for measuring operation time required for the recording on each recording medium, and memory means for storing the operation time for each of the recording media, measured by the operation time measuring means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

write time measuring means for measuring write time required for writing on each recording medium, starting from the initiation of the writing through the termination of the writing, and write time memory means for storing the write time for each the recording medium, measured by the operation time measuring means.

The first object of the present invention can also be achieved by a media information distribution and recording system for distributing media information from a central apparatus to terminal apparatus through a network and for recording the media information on a detachable recording medium in the terminal apparatus, wherein the terminal apparatus serves as a transmitting terminal apparatus and also as a receiving terminal apparatus and comprises:

recording instruction means for designating specified media information to be recorded on the detachable recording medium and providing recording instructions concerning the recording of the designated specified media information, which recording instructions include a recording completion time at which the recording of the designated specified media information is to be completed, booking means for booking the recording completion time provided by the recording instruction means, monitoring means for monitoring whether or not there is detected record idling time free of any recording operation to be conducted before a predetermined time prior to the recording completion time booked by the booking means is reached, and also for monitoring whether or not the predetermined time has been reached, media information downloading means for downloading the designated specified media information from the central apparatus to the terminal apparatus, media information recording means for recording on the recording medium the designated specified media information downloaded by the media information downloading means when the record idling time has been detected by the monitoring means or when the predetermined time has been reached, booking control data collection means for collecting booking control data concerning the booking, and booking control data memory means for storing the booking control data.

In the above media information distribution and recording system, the terminal apparatus may further comprise media information storage means for storing the designated specified media information, and the media information downloading means is configured to download the designated specified media information either from the central apparatus or from the media information storage means.

Furthermore, in the above media information distribution and recording system, the booking control data collected by the booking control data collection means comprises at least one item of information concerning:

the number of recording media used for recording, an operation time required for the recording on each recording medium, a write time required for writing on each recording medium, starting from the initiation of the writing through the termination of the writing, the number of bookings, a lead time from a booking reception time at which the booking is accepted through the recording completion time booked, or a reception time gap between the recording completion time booked and an actual receiving time at which the recording medium on which the designated specified media information is recorded is actually received by a customer.

In the above media information distribution and recording system, the terminal apparatus further comprises statistical data analyzing means for statically analyzing the booking control data.

Furthermore, in the above media information distribution and recording system, the booking control data may comprise at least one item of information concerning:

the number of recording media used for recording, an operation time required for the recording on each recording medium, a write time required for writing on each recording medium, starting from the initiation of the writing through the termination of the writing, the number of bookings, a lead time from a booking reception time at which the booking is accepted through the recording completion time booked, or a reception time gap between the recording completion time booked and an actual receiving time at which the recording medium on which the designated specified media information is recorded is actually received by a customer.

In the above media information distribution and recording system, the booking control data collection means may comprise booking number counting means for counting the number of bookings conducted by the booking means as the booking control data.

Furthermore, in the above media information distribution and recording system, the booking control data collection means may comprise lead time assessment means for assessing a lead time from a booking reception time at which the booking is accepted through the recording completion time booked as the booking control data.

In the above media information distribution and recording system, the booking control data collection means may comprise reception time gap assessment means for assessing a reception time gap between the recording completion time booked and an actual receiving time at which the recording medium on which the designated specified media information is recorded is actually received by a customer, as the booking control data.

In the above media information distribution and recording system, the booking control data collection means comprises recording medium number counting means for counting the number of detachable recording media used for recording, as the booking control data.

In the above media information distribution and recording system, the booking control data collection means may comprise operation time measuring means for measuring operation time required for the recording on each recording medium, as the booking control data.

In the above media information distribution and recording system, the booking control data collection means comprises write time measuring means for measuring write time required for writing on each recording medium, starting from the initiation of the writing through the termination of the writing operation, as the booking control data.

In the above media information distribution and recording system, the terminal apparatus may further comprise control data transmission means for transmitting the booking control data to the central apparatus, and the central apparatus further comprises statistical data analyzing means for statistically analyzing the booking control data transmitted thereto by the control data transmission means in the terminal apparatus.

In the above media information distribution and recording system, the booking control data may comprise at least one item of information concerning:

the number of recording media used for recording, an operation time required for recording on each recording medium, a write time required for writing on each recording medium, starting from the initiation of the writing through the termination of the writing, the number of bookings, a lead time from a booking reception time at which the booking is accepted through the recording completion time booked, or a reception time gap between the recording completion time booked and an actual receiving time at which the recording medium on which the designated specified media information is recorded is actually received by a customer.

The second object of the present invention can also be achieved by a media information recording apparatus for recording media information on a detachable recording medium, comprising:

recording instruction means for designating specified media information to be recorded on the detachable recording medium and providing recording instructions concerning the recording of the designated specified media information, receipt code indication means for indicating a receipt code in accordance with the recording instructions provided, charging amount calculation means for calculating the amount of the charge based on the recording instructions provided by the recording instruction means, and charging amount indication means for indicating the amount of the charge.

In the above media information recording apparatus, the charging amount indication means may comprise (1) bill issuing means for issuing a bill in which the amount of the charge is indicated, (2) display means for displaying the amount of the charge, (3) acoustic wave or voice outputting means for outputting an acoustic wave or a voice indicating the amount of the charge, or at least two of the bill issuing means, the display means, and acoustic wave or voice outputting means in combination.

The second object of the present invention can also be achieved by a media information recording apparatus for recording media information in a recording medium, comprising:

recording medium number counting means for counting the number of recording media used for recording.

The second object of the present invention can also be achieved by a media information recording apparatus for recording media information in a recording medium, comprising:

operation time measuring means for measuring operation time required for the recording on each recording medium, and memory means for storing the operation time for each of the recording media, measured by the operation time measuring means.

The second object of the present invention can also be achieved by a media information recording apparatus for recording media information in a recording medium, comprising:

write time measuring means for measuring write time required for writing on each recording medium, starting from the initiation of the writing through the termination of the writing, and write time memory means for storing the write time for each the recording medium, measured by the operation time measuring means.

The second object of the present invention can also be achieved by a media information recording apparatus for recording media information in a recording medium, comprising:

recording instruction means for designating specified media information to be recorded on the detachable recording medium and providing recording instructions concerning the recording of the designated specified media information, which recording instructions include a recording completion time at which the recording of the designated specified media information is to be completed, booking means for booking the recording completion time provided by the recording instruction means, monitoring means for monitoring whether or not there is detected record idling time free of any recording operation to be conducted before a predetermined time prior to the recording completion time booked by the booking means is reached, and also for monitoring whether or not the predetermined time has been reached, media information downloading means for downloading the designated specified media information from the central apparatus to the terminal apparatus, media information recording means for recording on the recording medium the designated specified media information downloaded by the media information downloading means when the record idling time has been detected by the monitoring means or when the predetermined time has been reached, booking control data collection means for collecting booking control data concerning the booking, and booking control data memory means for storing the booking control data.

The above media information recording apparatus may further comprise media information storage means for storing the designated specified media information, and the media information downloading means is configured to download the designated specified media information either from the central apparatus or from the media information storage means.

In the above media information recording apparatus, the booking control data collected by the booking control data collection means may comprise at least one item of information concerning:

the number of recording media used for recording, an operation time required for the recording on each recording medium, a write time required for writing on each recording medium, starting from the initiation of the writing through the termination of the writing, the number of bookings, a lead time from a booking reception time at which the booking is accepted through the recording completion time booked, or a reception time gap between the recording completion time booked and an actual receiving time at which the recording medium on which the designated specified media information is recorded is actually received by a customer.

The above media information recording apparatus may further comprise statistical data analyzing means for statically analyzing the booking control data.

In the above media information recording apparatus, the booking control data may comprise at least one item of information concerning:

the number of recording media used for recording, an operation time required for the recording on each recording medium, a write time required for writing on each recording medium, starting from the initiation of the writing through the termination of the writing, the number of bookings, a lead time from a booking reception time at which the booking is accepted through the recording completion time booked, or a reception time gap between the recording completion time booked and an actual receiving time at which the recording medium on which the designated specified media information is recorded is actually received by a customer.

In the above media information recording apparatus, the booking control data collection means may comprise booking number counting means for counting the number of bookings conducted by the booking means as the booking control data.

In the above media information recording apparatus, the booking control data collection means may comprise lead time assessment means for assessing a lead time from a booking reception time at which the booking is accepted through the recording completion time booked as the booking control data.

In the above media information recording apparatus, the booking control data collection means comprises reception time gap assessment means for assessing a reception time gap between the recording completion time booked and an actual receiving time at which the recording medium on which the designated specified media information is recorded is actually received by a customer, as the booking control data.

In the above media information recording apparatus, the booking control data collection means comprises recording medium number counting means for counting the number of detachable recording media used for recording, as the booking control data.

In the above media information recording apparatus, the booking control data collection means may comprise operation time measuring means for measuring operation time required for the recording on each recording medium recording medium, as the booking control data.

In the above media information recording apparatus, the booking control data collection means may comprise write time measuring means for measuring write time required for writing on each recording medium, starting from the initiation of the writing through the termination of the writing operation, as the booking control data.

The above media information recording apparatus may further comprise control data transmission means for transmitting the booking control data.

The third object of the present invention can also be achieved by a recording medium storing a program that controls the operation of a computer in such a manner that specified media information to be recorded in a recording medium is designated, recording instructions concerning the recording of the designated specified media information are provided, a receipt code is input in accordance with the recording instructions provided, the amount of charge is calculated based on the recording instructions, and a bill with the receipt code and the amount of the charge is issued by bill issuing means.

The third object of the present invention can also be achieved by a recording medium storing a program that controls the operation of a computer in such a manner that the number of recording media used for recording is counted by recording medium number counting means.

The third object of the present invention can also be achieved by a recording medium storing a program that controls the operation of a computer in such a manner that the operation time required for the recording on each recording medium is measured by operation time measuring means, and the operation time measured for each the recording media is stored in memory means.

The third object of the present invention can also be achieved by a recording medium storing a program that controls the operation of a computer in such a manner that the write time required for writing on each recording medium, starting from the initiation of the writing through the termination of the writing, is measured by write time measuring means for measuring, and the write time for each the recording medium, measured by the operation time measuring means, is stored in write time memory means.

The third object of the present invention can also be achieved by a recording medium storing a program that controls the operation of a computer in such a manner that specified media information to be recorded on a detachable recording medium is designated, with the provision of recording instructions concerning the recording of the designated specified media information, including a recording completion time at which the recording of the designated specified media information is to be completed, the recording completion time is booked, whether or not there is detected record idling time in which no recording operation is to be conducted by a predetermined time before the recording completion time booked, and/or whether or not the predetermined time has been reached, is monitored, instructions for recording the designated specified media information are issued to have recording means record the designated specified media information on the detachable recording medium, when the record idling time has been detected by the monitoring means or when the predetermined time has been reached, and the number of bookings conducted by the booking means is counted, or a lead time which is the time interval between the date and time of the booking and the date and time for the recording completion time booked is measured, and the number of bookings counted or the lead time measured is stored.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is a block diagram of an example of a communications control section for the terminal apparatus for use in the present invention.

FIG. 5B is a block diagram of another example of a communications control section for the terminal apparatus for use in the present invention.

FIG. 8 is a schematic illustration of an example of another menu displayed on a screen of the recording operation instruction unit.

FIG. 9 is a schematic illustration of an example of a further menu displayed on a screen of the recording operation instruction unit.

FIG. 10 is a schematic partial illustration of a receipt table for use in the present invention.

FIG. 11 is a schematic partial illustration of a media information list for use in the present invention.

FIG. 12 is a schematic illustration of a ticket that can be issued in the present invention.

FIG. 13 is a schematic partial illustration of a inner holding media information list for use in the present invention.

FIG. 15 is a schematic partial illustration of an example of a recording unit administration table for use in the present invention.

FIG. 16 is a schematic illustration of an example of an address administration table for use in the present invention.

FIG. 17 is a schematic illustration of an example of an administration table for use in the present invention.

FIG. 20 is a schematic illustration of a further example of a menu displayed on a screen of the recording operation instruction unit.

FIG. 21 is a schematic partial illustration of a message displayed on a screen of the recording operation instruction unit.

FIG. 40 is a schematic partial illustration of a media information list for use in the present invention.

FIG. 41 is a schematic illustration of a bill issued in the present invention.

DESCRIPTION OF THE PREFERRED EMBODIMENTS

Other features of this invention will become apparent in the course of the following description of exemplary embodiments, which are given for illustration of the invention and are not intended to be limiting thereof.

Figure 1:
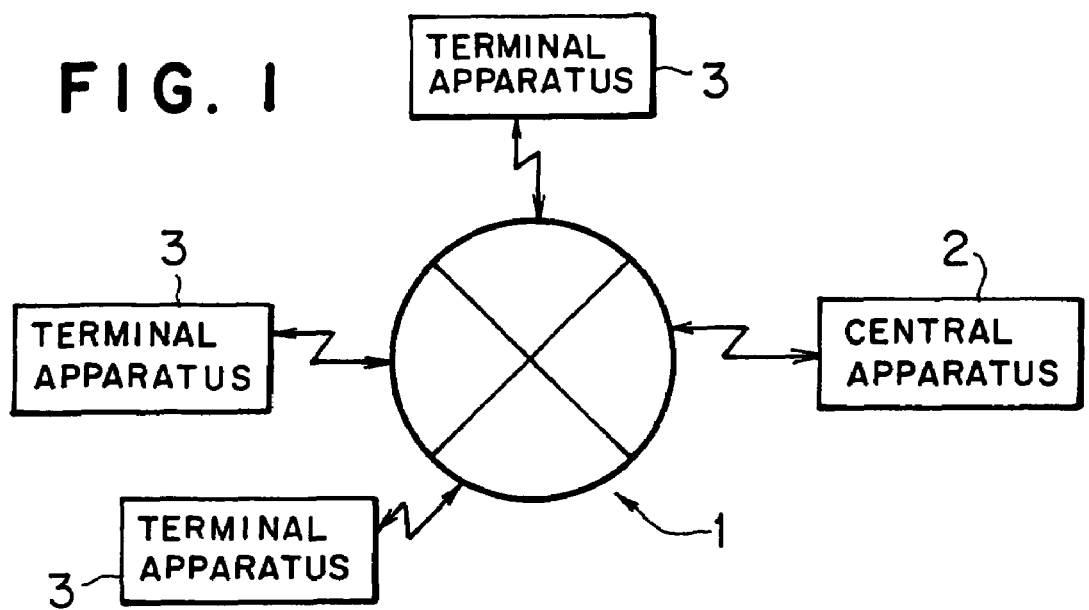
FIG. 1 is an overall diagram showing the structure of a media information distribution and recording system of the present invention.

FIG. 1 is an overall diagram showing the structure of a media information distribution and recording system of the present invention. As shown in FIG. 1, the media information distribution and recording system of the present invention comprises a network 1 such as telecommunications network, an ISDN (Integrated Services Digital Network), or a network including a communications satellite, a central apparatus 2 for registering media information such as a plurality of musical compositions, including transmission means for transmitting at least part of such media information through the above-mentioned network 1, and a plurality of terminal apparatus 3 for downloading the media information from the central apparatus 2 and recording the downloaded media information in recording media such as CDs.

Figure 2:
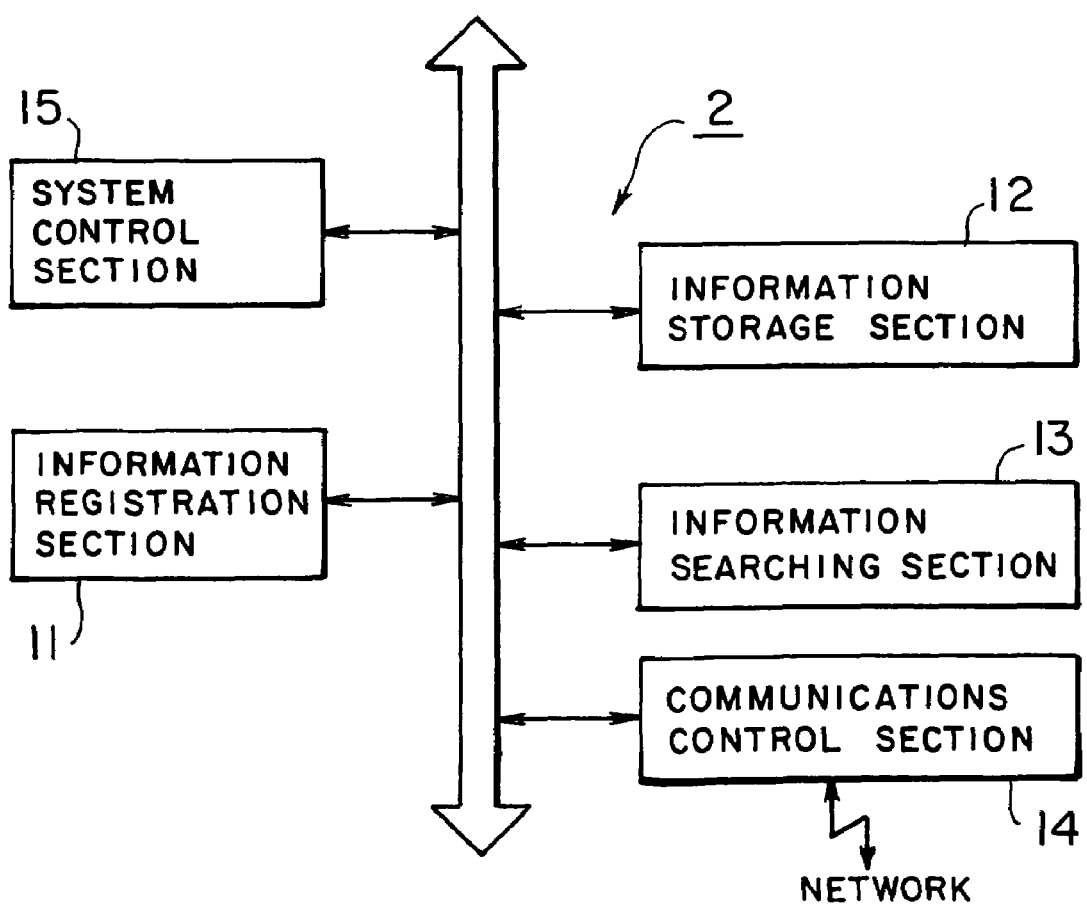
FIG. 2 is a block diagram of the structure of the central apparatus for use in the present invention.

FIG. 2 is a block diagram of the structure of the central apparatus 2. As shown in FIG. 2, the central apparatus 2 comprises an information registration section 11 for registering media information such as a plurality of musical compositions, an information storage section 12 for storing therein the above registered media information, an information searching section 13 for searching designated media information from the media information stored in the information storage section 12 on a request provided through the terminal apparatus 3, a communications control section 14 for distributing the searched media information to the terminal apparatus 3, and a system control section 15 for administering and controlling the central apparatus 2 in its entirety.

In the above, the information registration section 11, the information searching section 13, and the system control section 15 can share, for instance, a ROM in which a CPU and a program are incorporated, and the communications control section 14 can have a ROM with a CPU and a program for exclusive use therein. The information storage section 12 can perform its function, for instance, by means of an optical disc unit from which the stored media information can be read or in which partial overwriting of media information can be carried out.

Figure 3:
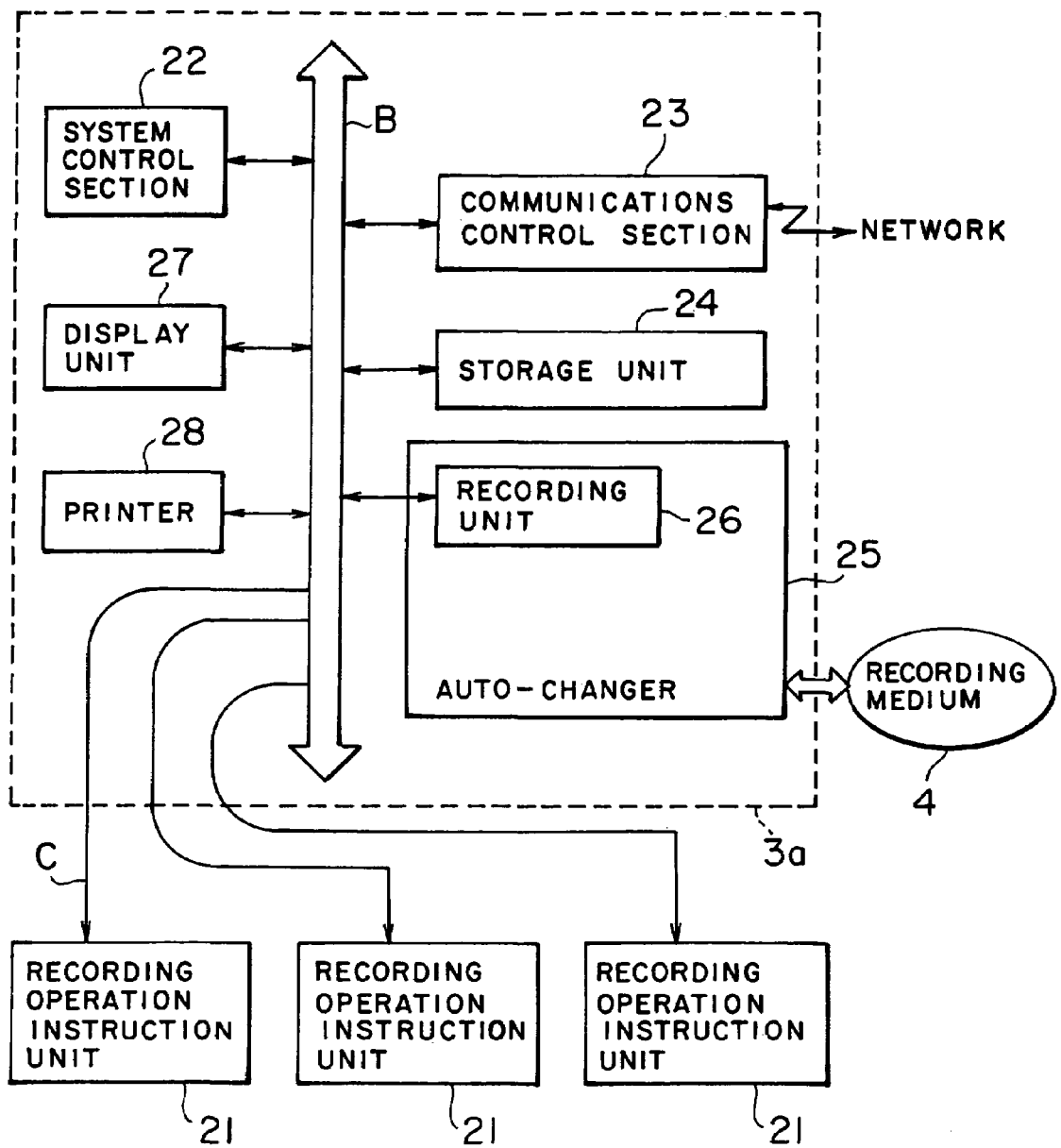
FIG. 3 is a block diagram showing the structure of a terminal apparatus for use in the present invention.

FIG. 3 is a block diagram showing the structure of the above-mentioned terminal apparatus 3 for use in the present invention.

As shown in FIG. 3, the terminal apparatus 3 comprises a main body 3a, a plurality of recording operation instruction units 21, each of which is independently configured to designate media information to be recorded and to issue instructions for the recording of the designated media information on a recording medium 4.

The main body 3a comprises a system control section 22 for administering and controlling the terminal apparatus 3 in its entirety, a communications control section 23 for controlling communications for downloading the media information from the central apparatus 2 through the network 1, a storage unit 24 for storing the media information downloaded from the central apparatus 2 through the communications control system 23, a recording unit 26 for recording the media information designated by the recording operation instruction unit 21 on the recording medium 4, an auto-changer 25, in which the above-mentioned recording unit 26 is incorporated, and which holds a preset of blank recording media and loads the recording media one by one into the recording unit 26 whenever the recording of the media information is carried out, a display unit 27 and a printer 28.

Each of the above-mentioned recording operation instruction units 21 is provided with, for instance, a liquid display unit and a transparent touch-panel which is overlaid on a screen of the liquid display unit, and is connected to a bus B by wireless or through a cable C and an input and output port (not shown) provided within the main body 3a.

Figure 4:
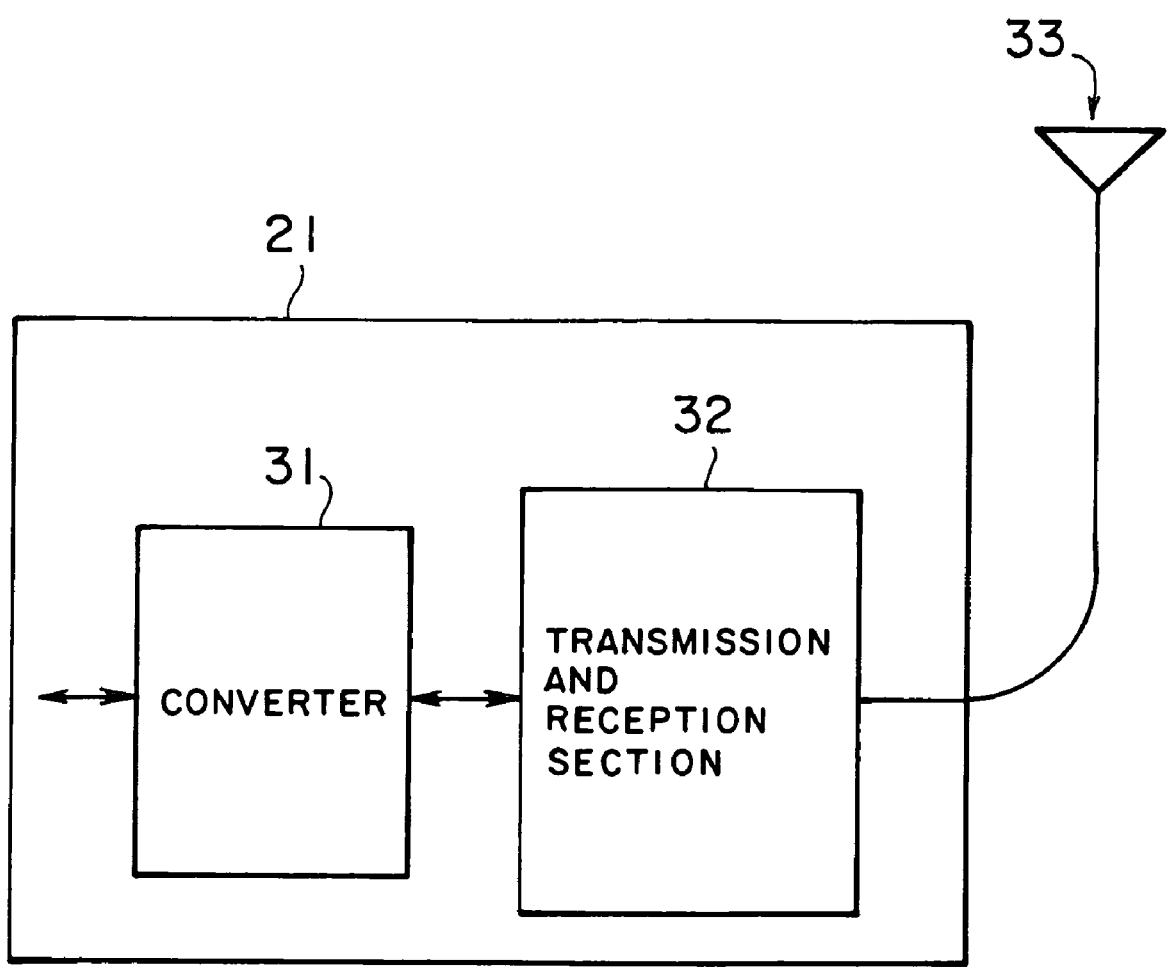
FIG. 4 is a block diagram of a recording operation instruction unit for use in the present invention.

Alternatively, as shown in FIG. 4, each of the above-mentioned recording operation instruction units 21 is provided with (1) a converter 31 for converting input digital data to analog signals, or for converting analog signals input from the main body 3a to digital data, and (2) a transmission and reception section 32 for transmitting from an antenna 33 the analog signals output from the converter 31 with the signals being carried on a carrier, or abstracting analog signals from the carrier received by the antenna 33 and transferring the abstracted analog signals to the converter 31, and is connected by wireless or through the cable C to the main body 3a.

The system control section 22 comprises a CPU, a program built-in ROM, a RAM, and a clock circuit. The communications control section 23 also comprises a CPU. The storage unit 24 comprises a large capacity hard disk unit, or a partially rewritable optical disk unit.

The communications control section 23 can be configured either (1) to communicate through a telecommunications network, for example, as shown in FIG. 5A, or (2) to communicate through an ISDN, for example, as shown in FIG. 5B.

The communications control section 23 with the structure as shown in FIG. 5A comprises a ROM 34 in which, for example, a program for a transmission control procedure, is incorporated, a CPU 35 for performing data communication in accordance with the above-mentioned program, a data modem 36 for modulating the digital data to analog signals for transmission thereof to the network 1, and for demodulating the analog signals to the digital data for transmission thereof to the CPU 35, and a network control unit (NCU) 37 for controlling the connection of the network. When necessary, the ROM 34 is also provided with a program for an upper layer protocol (transmission control procedure) which makes it possible to perform e-mail which is compatible with internet, and file transmission.

The communications control section 23 with the structure as shown in FIG. 5B comprises a ROM 38 with a built-in program, a CPU 39 for performing an upper layer protocol in accordance with the program, a B-channel transmission control and a D-channel transmission of ISDN, a layer 1 signal control section 40 for performing signal control of an ISDN layer 1, an ISDN interface circuit 41 for transmitting and receiving signals, and a network terminator (NT) 42.

EXAMPLE 1

With reference to the flow chart shown in FIG. 6, the operation of a first embodiment of the media information distribution and recording system of the present invention will now be explained.

It is supposed that blank recording media 4 are already loaded in the auto-changer 25.

Figure 7:
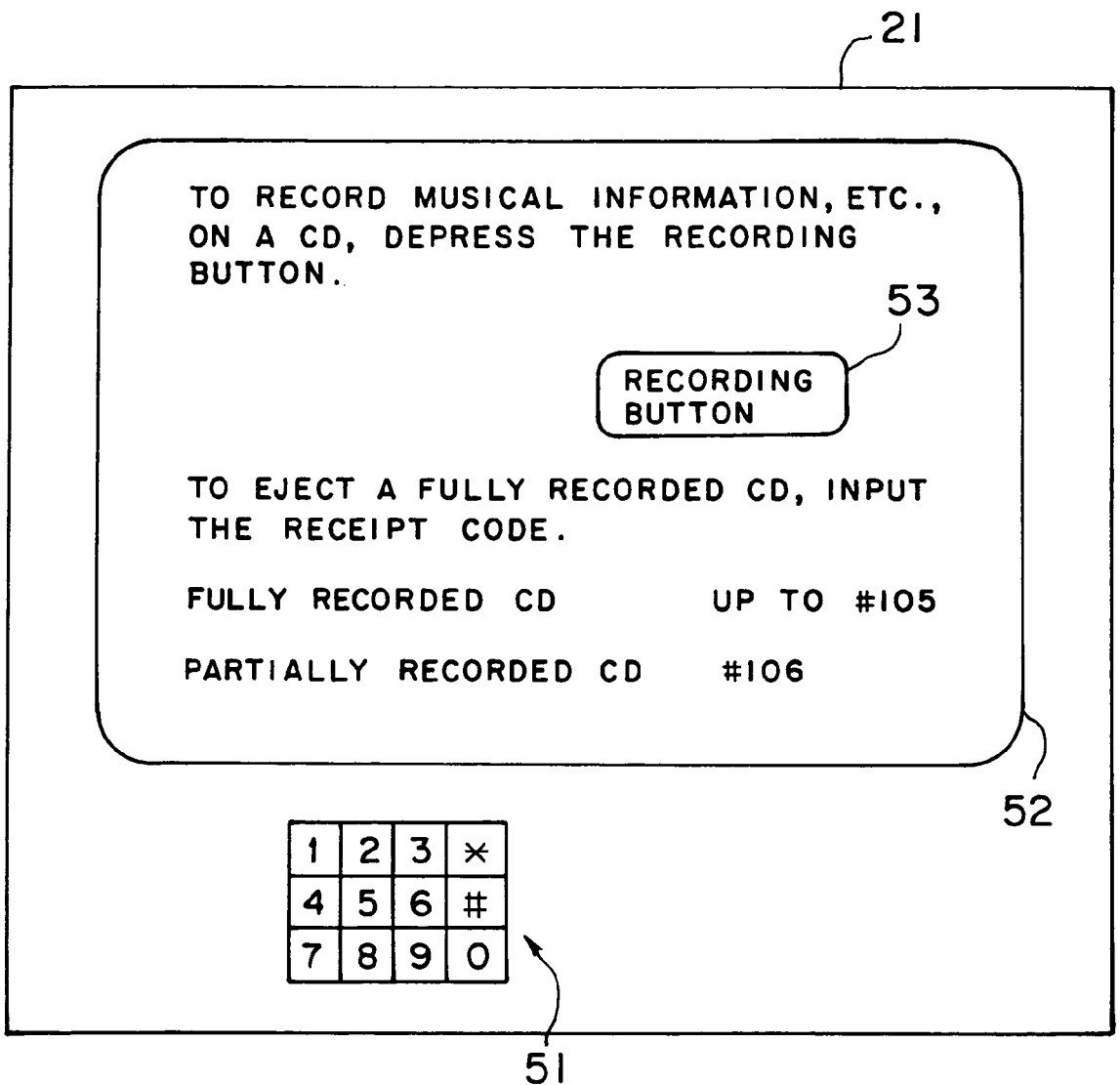
FIG. 7 is a schematic illustration of an example of a menu displayed on a screen of the recording operation instruction unit.

When the recording operation instruction unit 21 is not in use, a message, for example, as shown in FIG. 7, is displayed on a screen 52 of the recording operation instruction unit 21 by the system control section 22. When a customer depresses a recording button 53 in accordance with the message, a transparent touch panel which is overlaid on the screen 52 detects the depressed position, and positional information concerning the detected depressed position is transmitted to the system control section 22 through the cable C or the antenna 33 as shown in FIG. 4.

A plurality of input and output ports disposed within the main body 3a is made to correspond to each of the recording operation instruction units 21, so that the system control section 22 detects, through the positional information transmitted thereto, that the recording button 53 of an nth recording operation instruction unit 21 has been depressed, and transmits menu information to be displayed on the screen 52 to the recording operation instruction unit 21 through the corresponding nth input and output port. Thus, a menu as shown in FIG. 8 is displayed on the screen 52.

Figure 6:
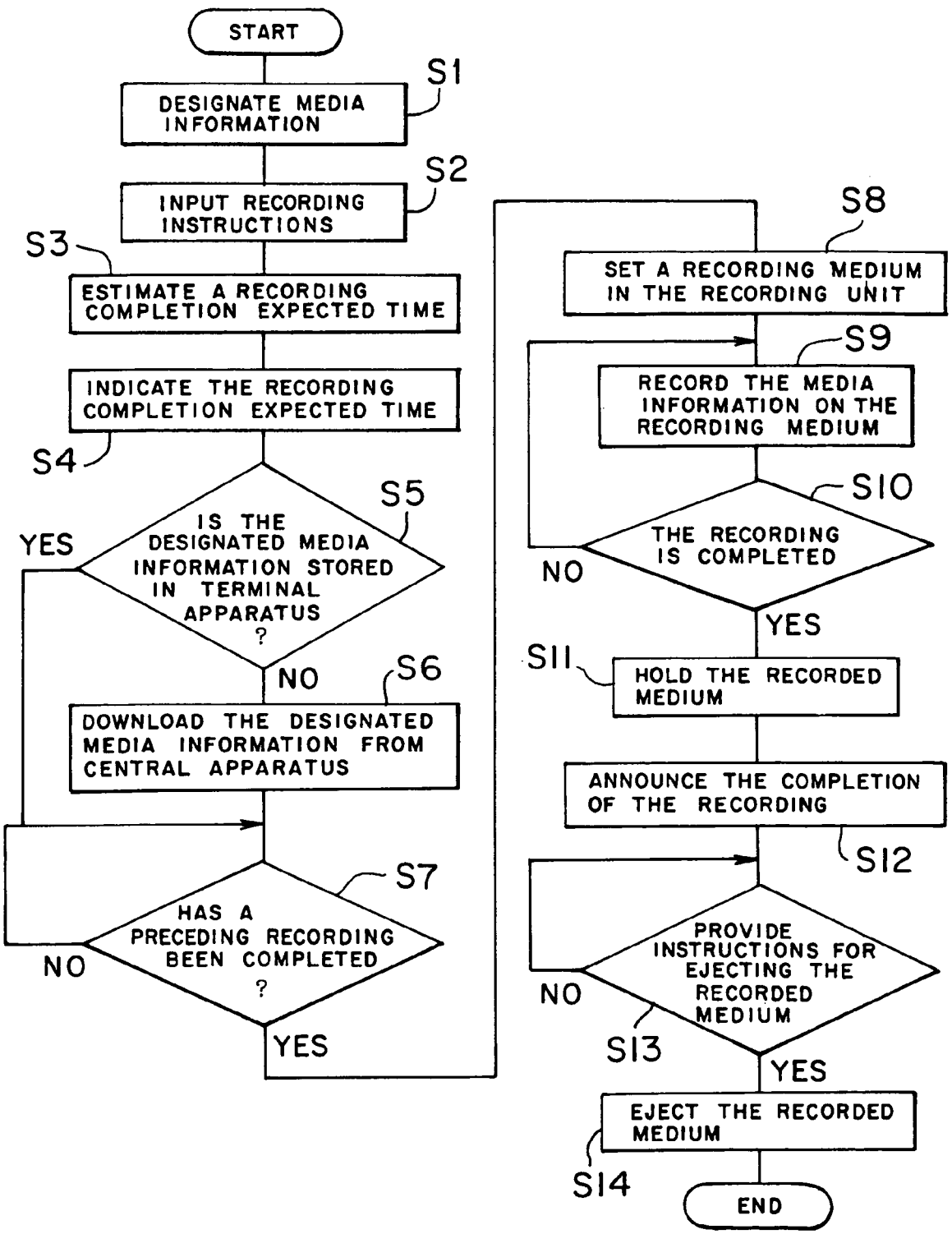
FIG. 6 is a flow chart showing the operation of a first embodiment of the media information distribution and recording system of the present invention.

For example, when a button 1 in the menu shown in FIG. 8 is depressed to designate a certain musical composition, the system control section 22 detects the designation, and detects, for instance, the title of the musical composition, the name of a singer who sings the musical composition and other information shown in a menu at a final step in the designation (refer to step S1 in FIG. 6).

The system control section 22 downloads categorized media information lists which are registered in the central apparatus 2 through the communications control section 23 and stores the categorized media information lists in the recording unit 24, so that the above-mentioned menus are displayed in accordance with the lists.

When the first designation of the media information is thus completed, the menu as shown in FIG. 9 is displayed under the control of the system control section 22. When a second designation is made, the above-mentioned steps are likewise repeated. When the second designation or succeeding designations are made, the menu as shown in FIG. 9 is displayed, and by depressing a button in the menu for returning to an upper layer menu, a new designation in accordance with the upper layer menu can be made.

With reference to FIG. 6, when the designation of one or a plurality of media information items to be recorded in one recording medium is completed at Step S1, the recording button in the menu as shown in FIG. 9 is depressed at Step S2. By this time, the setting of a media code for the designated media information is completed in a receipt table as shown in FIG. 10, which is stored in the RAM within the system control section 22. The media code is a code assigned to each piece of media information which is registered in the central apparatus 2, and is shown on the categorized media information lists.

To the receipt codes in the receipt table shown in FIG. 10, for instance, serial numbers 001 to 999, are assigned. When a first media information item to be recorded is accepted at Step S1, the system control section 22 assigns a serial number to the first media information item in the order of the acceptance thereof. In the receipt table shown in FIG. 10, the receipt code "000" indicates that the recording of the media information has been completed and the customer has received the recorded media information. After the receipt code "999" has been assigned, the receipt number "001" is assigned. In this case, the setting is such that the recorded media information corresponding to the previous code "001" has been received by a customer.

Furthermore, in the receipt table shown in FIG. 10, an expected recording completion time is set as follows:

The system control section 22, when receiving recording instructions, determines an expected recording completion time at which the recording of the media information designated with the receipt code is expected to be completed from (1) an expected recording completion time with a receipt code immediately before the receipt code in the receipt table, and (2) the data size for the media information to be recorded in the media information list.

A recording time T for unit data size is determined when this system is designed, and the recording time T is set within the terminal apparatus 3 in advance, so that in the case of the receipt code 023 in the receipt table in FIG. 10, the data size for each of the media information items 3026, 3819, 3347 and 3562 is obtained from the media information list, and a total data size thereof is determined. A time required for recording the data with the total data size is then determined using the above-mentioned recording time T. The thus determined time is added to the expected recording completion time with the receipt code 022, that is, 10:56, 17th, whereby the expected recording completion time with the receipt code 023 is determined to be 11:37, 17th.

Whenever the preceding recording is completed, the system control section 22 detects the time, using a clock circuit incorporated in the system control section 22. When necessary, the succeeding expected recording completion time is corrected. Further, when necessary, the expected recording completion time is determined by adding to the recording time a downloading time required for downloading the media information from the central apparatus 2.

When the expected recording completion time is thus determined, the system control section 22 transmits the receipt code and the determined expected recording completion time to the recording operation instruction unit 21 and a message indicating the receipt code and the expected recording completion time is displayed on the screen 52 of the recording operation instruction unit 21 by the system control section 22 (refer to Step S3 in FIG. 6).

Alternatively, a ticket with the same message as in FIG. 12 is issued, for instance, by the printer 28 of the main body 3a. The message can be printed on the ticket, or can be magnetically recorded in a magnetic layer of a ticket issued.

The above message can also be output in the form of a voice message which is generated by conventional speech synthesizing means provided with a speaker.

The above message may include either the receipt code or the expected recording completion time. It is preferable that the above message include both the receipt code and the expected recording completion time even when the message is displayed, issued in the form of the ticket or output by voice using the speech synthesizing means.

When the system control section 22 reaches an idling state, the system control section 22 judges whether or not the media information designated to be recorded is stored in the storage unit 24 (refer to Step S5 in the flow chart shown in FIG. 6). This is because when the media information is downloaded from the central apparatus 2, the terminal apparatus 3 stores the media information in the storage unit 24 as long as the storage unit 24 has a blank area for recording. For this purpose, the system control section 22 is provided with an inner holding media information list, which differs from the media information list as shown in FIG. 11, but is similar thereto as shown in FIG. 13. As shown in FIG. 13, the inner holding media information list contains a registration date indicating when the media information was registered and stored in the storage unit 24, the number of recordings of the media information, A, during the past week, the number of recordings of the media information, B, during the present week, and the total number of recordings of the media information, A+B, with respect to each media information item.

When no blank area is left for recording, after the passage of a predetermined period of time from the registration date, when the total number of recordings, A+B, becomes less than a predetermined number of recordings, the record is removed from the list, and the media information corresponding to the removed record is deleted from the storage unit 24.

As shown in FIG. 13, the data size of each media information item is shown on the inner holding media information list, whereby, with respect to each media information item in the inner holding media information list, the data size thereof can be referred to when the expected recording completion time thereof is estimated.

When the designated media information is not found to be stored in the storage unit 24 after checking with reference to the inner holding media information list, that is, when Step S5 in the flow chart shown in FIG. 6 is No, the system control section 22 transmits a media information transfer request including the media code thereof to the central apparatus 2 through the communications control section 23, whereby the media information searching section 13 in the central apparatus 2 as shown in FIG. 2 searches the media information with the requested media code, reads the media information from the media information storage section 12, and transmits the media information to the terminal apparatus 3 through the communications control section 14. The media information is downloaded by the system control section 22 of the terminal apparatus 3 and stored in the storage unit 24. The system control section 22 registers the thus stored media information in the inner holdings media information list.

When the designated media information is found in the storage unit 24, that is, when Step S5 in the flow chart shown in FIG. 6 is Yes, or when the designated media information has been downloaded from the central apparatus 2 to the terminal apparatus 3, the system control section 22 monitors whether or not the recording of the media information with a receipt code prior to the present receipt code has been completed (Step S7→Step S7 in the flow chart shown in FIG. 6). When the recording of the preceding media information has been completed, that is, when Step S7 in the flow chart shown in FIG. 6 is Yes, one of the recording media 4 held in the auto-changer 25 is set in the recording unit 26 (Step S8 in the flow chart shown in FIG. 6).

Figure 14:
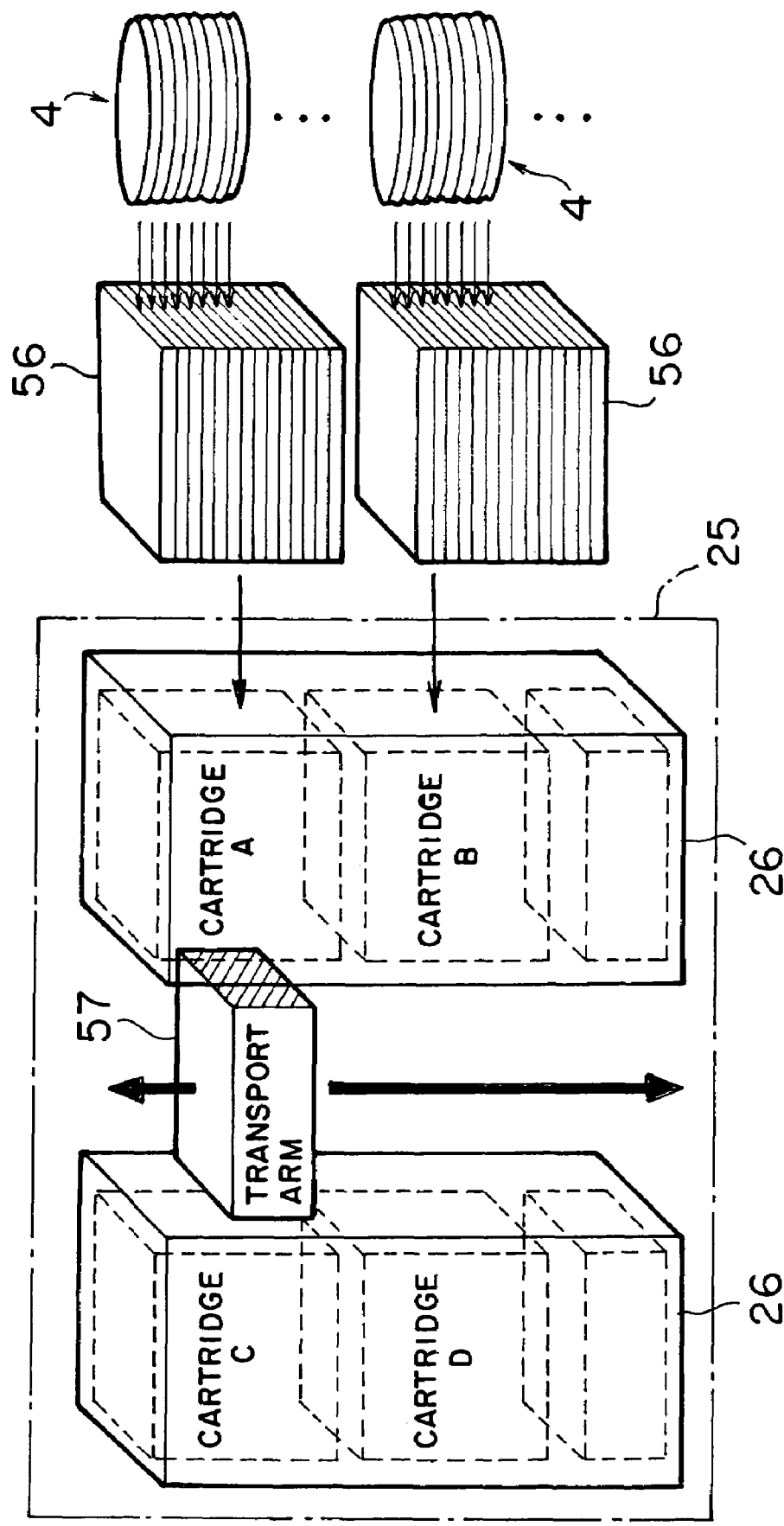
FIG. 14 is a schematic perspective view of an auto-changer 25 for use in the present invention, in which two recording units are incorporated.

FIG. 14 is a schematic perspective view of the auto-changer 25 in which two recording units 26 are incorporated. As shown in FIG. 14, a plurality of cartridges 56, in each of which about 50 blank recording media 4 such as CD-R are placed, is incorporated in the auto-changer 25. The blank recording media are loaded with such a cartridge as a loading unit in the auto-changer 25. A blank recording medium 4 with an address of a nth cartridge and an mth shelf is placed onto a vertically movable transport arm 57, and the transport arm 57 transports the recording medium 4 to the recording unit 26 and loads it into the recording unit 26.

The address of the recording medium 4 set in the recording unit 26 is registered in a recording unit administration table as shown in FIG. 15.

For determining the address of the above-mentioned blank recording medium 4, the system control section 22 is provided with an address administration table as shown in FIG. 16. In the address administration table shown in FIG. 16, the term "Vacant" in the column "Status of CD" indicates that the recording medium is no longer held on the shelf of the cartridge, for instance, the term "receipt code j1" indicates the receipt code is assigned to CD, the term "Recording Unit D1" indicates that the CD is now being set in Recording Unit D1, and the term "Blank CD" indicates that the CD held on the shelf is blank.

When issuing a receipt code, the system control section 22 refers to the above-mentioned address administration table, and the receipt code is assigned to a blank recording medium indicated by the term "Blank CD", so that the number of the blank recording media, which is registered, for instance, in a predetermined area of RAM, is reduced by one. The system control section 22 is provided with a table as shown in FIG. 17.

The system control section 22 reads the designated media information from the storage unit 24, and transfers the read designated media information to the above-mentioned recording unit 26, so that the media information is recorded on the recording medium 4 set in the recording unit 26 (Step S9 in the flow chart shown in FIG. 6).

When the recording is completed, that is, when Step S10 in the flow chart shown in FIG. 6 is Yes, the system control section 22 obtains the address of the recorded recording medium 4 from the recording unit administration table, returns the recorded recording media 4 to its address (nth cartridge, mth shelf), using the transport arm 57, and holds the recorded recording medium 4 on the shelf (Step S11 in the flow chart shown in FIG. 6).

Completion of the recording is announced (Step S12 in the flow chart shown in FIG. 6). When the announcement is made by voice, a conventional speech synthesis method can be employed for outputting the voice.

If fully recorded CDs and partially recorded CDs are always displayed as shown in FIG. 7, or if such information is always displayed on the display unit 27 of the main body 3a, a buzzing sound can confirm the recording state of the CDs and the completion of the recording thereof to the customer even when the customer is not waiting near the terminal apparatus 3.

In order to eject the fully recorded recording medium 4, the receipt code is input, using a ten-key pad 51, when the menu is displayed as shown in FIG. 7. The system control section 22 accepts the input receipt code as an instruction to eject the recorded recording medium 4, that is, Step S13 in the flow chart shown in FIG. 6 is Yes, so that the system control section 22 obtains the address of the recording medium 4 with the receipt code with reference to the table shown in FIG. 16 or FIG. 17, and the recording medium 4 is transported to the transport arm 57. The recording medium 4 is further moved by the transport arm 57 to an ejection outlet (not shown) from which the recording medium 4 can be removed.

When the system control section 22 is in an idling state with respect to the recording, one blank recording medium 4 is set for the next recording, and a receipt code is assigned to the blank recording medium 4 when the next recording instructions are accepted. In assigning the receipt codes to the blank recording media, the receipt codes are successively assigned to the blank recording media in one cartridge 56, and when the receipt codes have been assigned to all the blank recording media in the cartridge 56, the assignment is moved to the blank recording media in the next cartridge 56. Each of the cartridges 56 can be identified with respect to the loading percentage of the blank recording media, using a plurality of light emission diodes with different colored display lights, such as full, 50%, 20%, 10% and vacant, or with respect to the number of the blank recording media remaining in each cartridge 56.

With reference to the flow chart in FIG. 6, for example, even in the course of the monitoring period (S7→S7), or in the course of the recording of the media information on the recording medium 4 (S9→S10→S9), or while waiting for the ejection (S13→S13), the steps of the designation of the media information (S1) through the indication of the expected recording completion time (S4) can be carried out by depressing the recording button 53, with the message shown in FIG. 7 being displayed on the screen 52 of the recording operation instruction unit 21.

Furthermore, for example, even in the course of the monitoring period (S7→S7) and the recording of the media information on the recording medium 4 (S9→S10→S9), for example, the message shown in FIG. 7 is displayed on the screen 52, so that the recording medium 4 (S14) can be ejected by inputting the receipt code as ejection instructions, for instance, using the ten-key pad 51. For example, by depressing the above-mentioned recording button 53 or the ten-key pad 51, Steps S1 to S4, and Steps S13 to S14 can be subjected to interruption.

In this embodiment, when the recording instructions are given or accepted, the expected recording completion time and the receipt code can be indicated, for instance, in the form of tickets specifying the expected recording completion time and the receipt code, so that once the recording instructions are accepted, the customer can leave before the recording is finished, and return after the expected recording completion time to pick up the fully recorded CD. Furthermore, the correct fully recorded CD can be picked up without fail, for instance, using the receipt code printed on the tickets.

Furthermore, in this embodiment, before the preceding recording of media information is completed, recording instructions for the succeeding recording of media information can be accepted, and a plurality of recording operation instruction units 21 as shown in FIG. 3 is always provided to avoid having the customers wait for their turn in providing recording instructions.

Furthermore, since receipt codes for fully recorded recording media, and receipt codes for partially recorded recording media are always displayed in this embodiment, the customer can always check the recording status of the requested media information.

Furthermore, when the recording has been completed, the receipt code is announced, or the customer is informed of the completion of the recording by a buzzing sound.

The number of blank recording media held in each terminal apparatus can be displayed, so that blank recording media can be replenished before they are used up.

As mentioned above, in this embodiment, when the recording instructions are given or accepted, the expected recording completion time and the receipt code can be indicated, for instance, in the form of a ticket specifying, for instance, the expected recording completion time and the receipt code.

The ticket for this purpose can be a ticket on which the necessary information about the recording instructions for picking up the recorded medium, such as the expected recording completion time and the receipt code, is printed on the front side and is magnetically recorded in a magnetic recording layer on the back side thereof.

This ticket can be used to identify the recorded recording medium for picking up the same by inserting the ticket into a ticket inlet of the terminal apparatus 3 or the recording operation instruction unit 21. The information on the ticket is optically and magnetically read under the control of the system control section 22.

EXAMPLE 2

With reference to the flow chart shown in FIG. 18, the operation of a second embodiment of the media information distribution and recording system of the present invention will now be explained, in which the terminal apparatus 3 is used as a remote terminal apparatus from which recording instructions can be given through the network 1.

Figure 18:
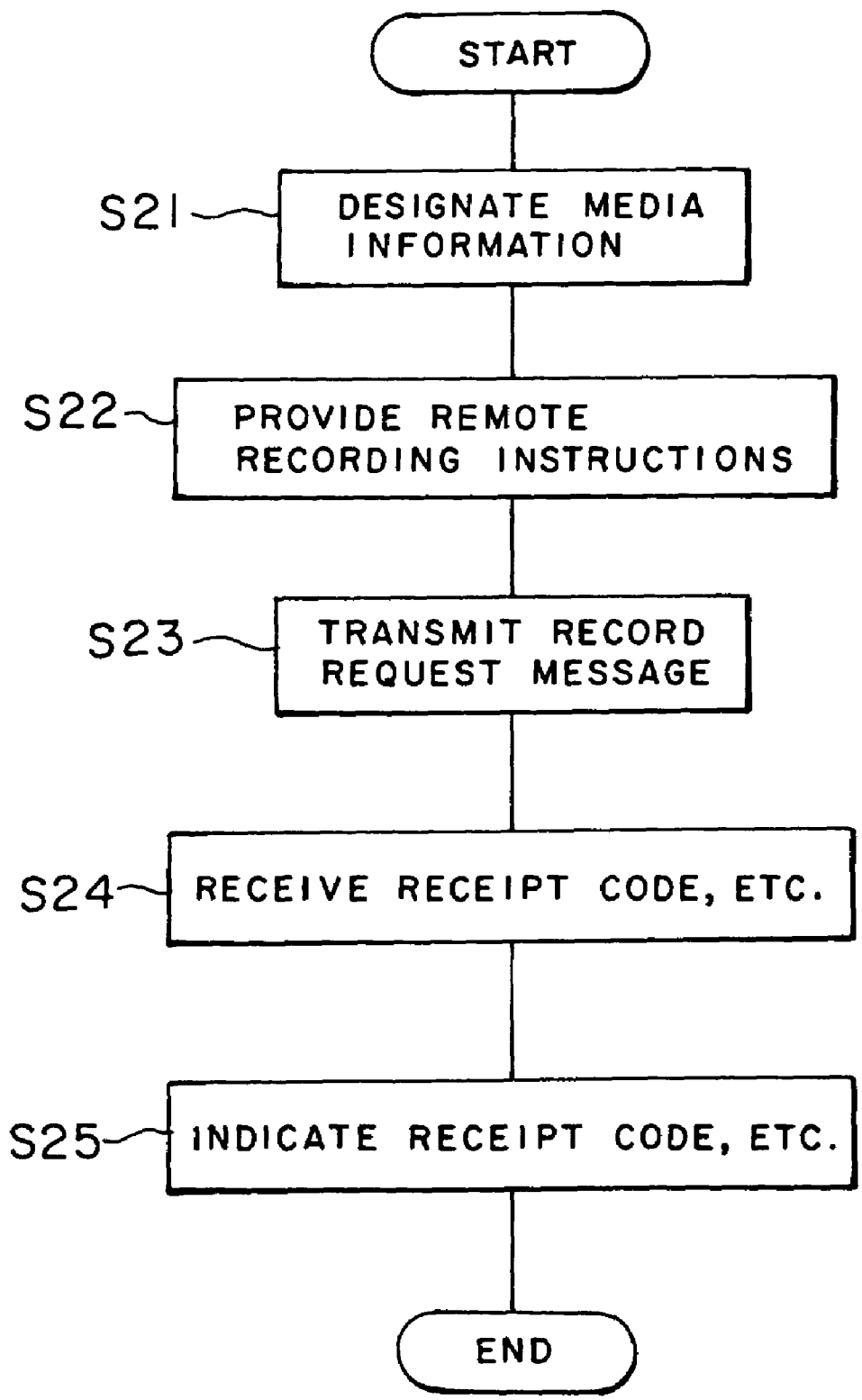
FIG. 18 is one flow chart showing the operation of a second embodiment of the media information distribution and recording system of the present invention.

The designation of media information performed at Step S21 in the flow chart shown in FIG. 18 is the same as that performed in Example 1 with reference to Step S1 in FIG. 6, so that further explanation about the designation of the media information is omitted here.

In Step S22, a menu as shown in FIG. 20 is displayed in the recording operation instruction unit 21 by the system control section 22. When the customer depresses a remote recording instruction button in the menu, the system control section 22 receives the remote recording instructions, displays a menu as shown in FIG. 21 on the screen of the recording operation instruction unit 21, and requests that the customer input an ID code for the terminal apparatus in which the recording is to be performed. This terminal apparatus is hereinafter referred to as the receiving terminal apparatus 3, and the terminal apparatus which is used as the remote terminal apparatus from which recording instructions can be given through the network 1 is hereinafter referred to as the transmitting terminal apparatus 3.

Figure 22:
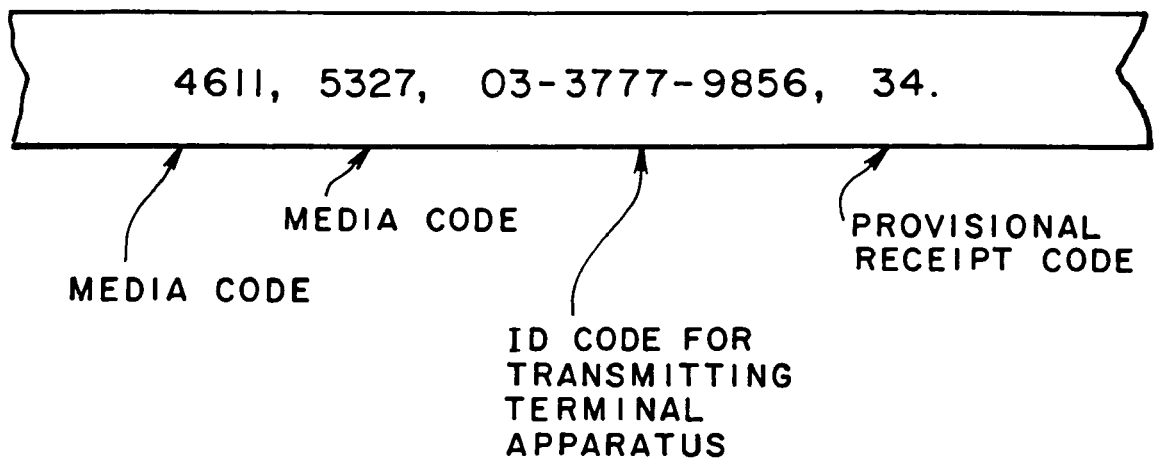
FIG. 22 is a schematic partial illustration of a record request message for recording instructions for use in the present invention.

When the ID code for the receiving terminal apparatus 3 is input, the system control section 22 receives the ID code, provides a record request message for recording instructions as shown in FIG. 22, and transmits the record request message to the receiving terminal apparatus (Step S23 in the flow chart shown in FIG. 18).

More specifically, the communications control section 23 receives the ID code from the system control section 22 and processes the receiving terminal apparatus 3 to connect with the receiving terminal apparatus 3, and then transmits the record request message to the connected receiving terminal apparatus 3.

In the record request message shown in FIG. 22, the leftmost code (first) and the next code (second) adjacent to the leftmost code are the codes for media information designated by the customer, and the third code is an ID code for the transmitting terminal apparatus from which the remote recording instructions are transmitted. The forth code is a provisional receipt code which is provisionally assigned to the remote recording instructions. The provisional receipt code is necessary for provisionally receiving the remote recording instructions before other remote recording instructions are accepted and processed.

In the above, the receiving terminal apparatus 3 can also be designated, for instance, by its address, the name of the shop where the receiving terminal apparatus 3 is installed, using a map, instead of the above-mentioned ID code.

The ID code, the address, the name of the shop where the receiving terminal apparatus 3 is installed, and other identification information for each terminal apparatus 3 are registered in the form of a registration list in the central apparatus 2, and such a registration list can be downloaded from the central apparatus 2 to each terminal apparatus 3.

Furthermore, each recording operation instruction unit 21 is provided with a touch panel on the screen 52, showing the names of shops where the terminal apparatus 3 are installed, so that when the customer touches the name of the shop on the screen 52, the system control section 22, using the registration list, can indicate to the customer the ID code and other identification information for the receiving terminal apparatus 3 in the shop.

Alternatively, the registration list in which the identification information concerning the designated terminal apparatus 3, such as the ID code and the name of the shop are not given, is downloaded from the central apparatus 3, and the record request message as shown in FIG. 22, with the addition of the identification information of the designated shop thereto, can be transmitted to the designated receiving terminal apparatus 3 through the central apparatus 2. When the central apparatus 2 receives the record request message, the central apparatus 2 identifies the ID code of the designated receiving terminal apparatus 3, and transmits the record request message to the designated receiving terminal apparatus 3.

When the receiving terminal apparatus 3 transmits to the transmitting terminal apparatus 3 a receipt code and other information such as an expected recording completion time in accordance with the above-mentioned record request message, and the transmitting terminal apparatus 3 receives the receipt code and other information (Step S24 in the flow chart shown in FIG. 18), the system control section 22 receives the receipt code and other information and has the recording operation instruction unit 21 display the receipt code and other information including the expected recording completion time (Step S25 in the flow chart shown in FIG. 18), or issue the same ticket used in Example 1, including such information as the receipt code and the expected recording completion time.

Figure 19:
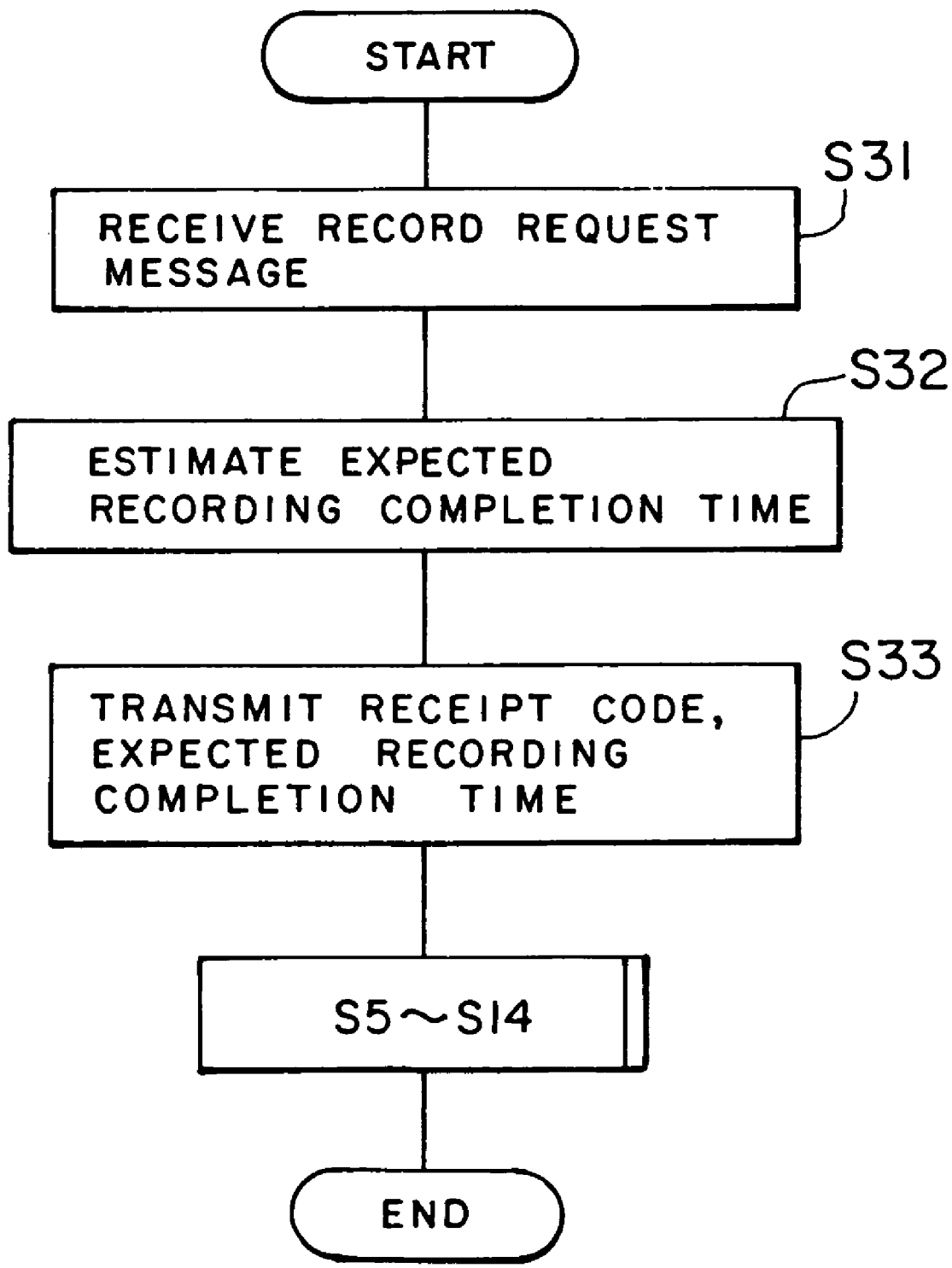
FIG. 19 is another flow chart showing the operation of a second embodiment of the media information distribution and recording system of the present invention.
Figure 23:
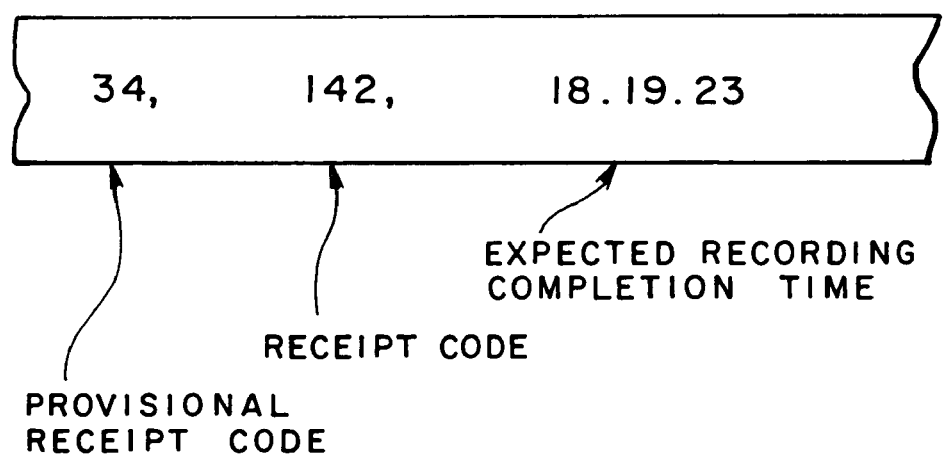
FIG. 23 is a schematic partial illustration of a response message for use in the present invention.

With reference to FIG. 19, when the receiving terminal apparatus 3 receives the record request message as shown in FIG. 22 from the transmitting terminal apparatus 3 (Step S31 in the flow chart shown in FIG. 19), the receiving terminal apparatus 3 estimates the expected recording completion time (Step S32 in the flow chart shown in FIG. 19) in the same manner as at Step S3 in Example 1 (refer to Step S3 in the flow chart in FIG. 6), outputs a response message as shown in FIG. 23, and transmits the response message to the transmitting terminal apparatus 3 through the communications control section 23 (Step S33 in the flow chart shown in FIG. 19).

In the response message shown in FIG. 23, the provisional receipt code is necessary for provisionally recording the recording instructions provided by the recording operation instruction unit 21 of the transmitting terminal apparatus 3. Steps S5 to S14 after Step S33 are exactly the same as Steps S5 to S14 in the flow chart in FIG. 6 in Example 1.

According to this embodiment, the terminal apparatus 3 can be used not only as the transmitting terminal apparatus, but also as the receiving terminal apparatus, so that the recording instructions can be sent from one terminal apparatus and the recorded medium can be received from another terminal apparatus which may be located far from the location of the terminal apparatus from which the recording instructions are sent.

Therefore, for example, a customer can order the recording of certain musical information on a CD, using the recording operation instruction unit in a first shop near his or her office, and a fully recorded CD can be received from another recording operation instruction unit in a second shop near his or her home on the way home, without wasting time waiting for the completion of the recording in the first shop.

The remote recording instructions can be provided by using information equipment such as a PC (personal computer) and a PDA (personal digital assistant) connected to the network 1.

An application program for the above-mentioned information equipment may be such a program that can realize the operation as shown in FIG. 18. As the information equipment, for example, a telephone can be used.

The receiving terminal apparatus 3 may be such a terminal apparatus that can carry out the operation as shown in FIG. 19. It is not always necessary for the receiving terminal apparatus 3 to comprise the recording operation instruction unit 21 for inputting the recording instructions on the spot.

EXAMPLE 3

With reference to the flow chart shown in FIG. 24, the operation of a third embodiment of the media information distribution and recording system of the present invention will now be explained.

In this flow chart, since the designation of media information to be recorded in Step S41 is the same as the designation of the media information in Step S1 in the flow chart in FIG. 6, further explanation of Step S41 is omitted here.

Figure 25:
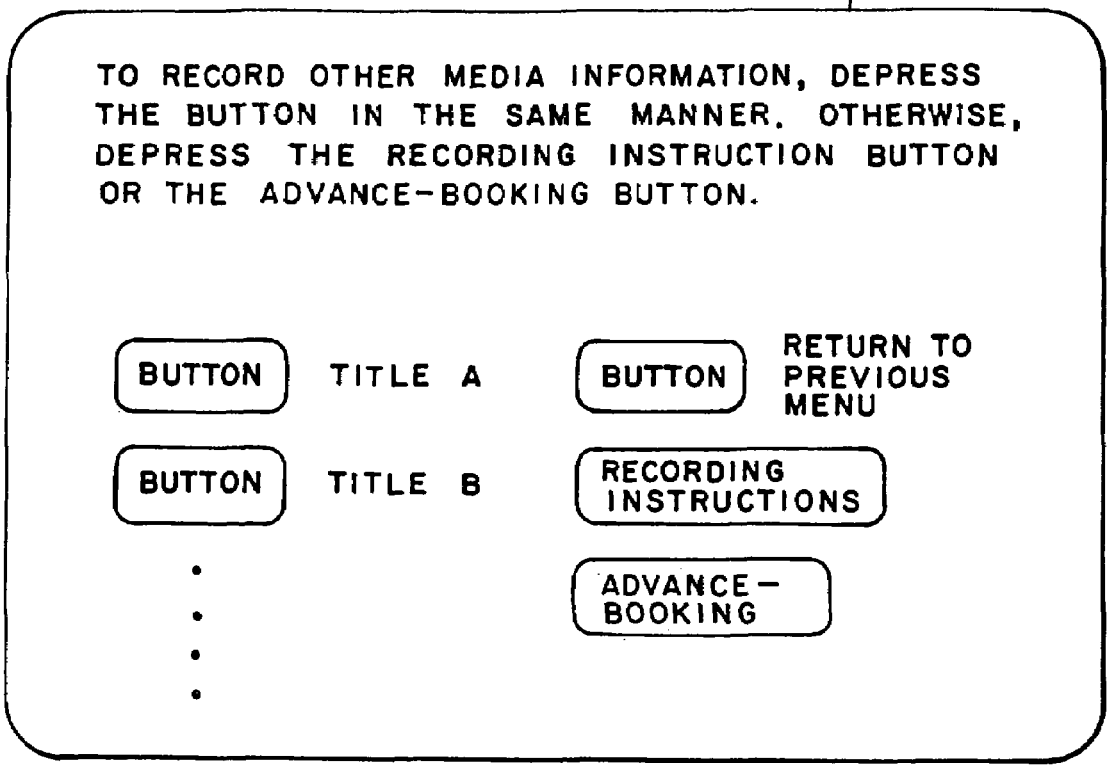
FIG. 25 is a schematic illustration of a further example of a menu displayed on a screen of the recording operation instruction unit.
Figure 26:
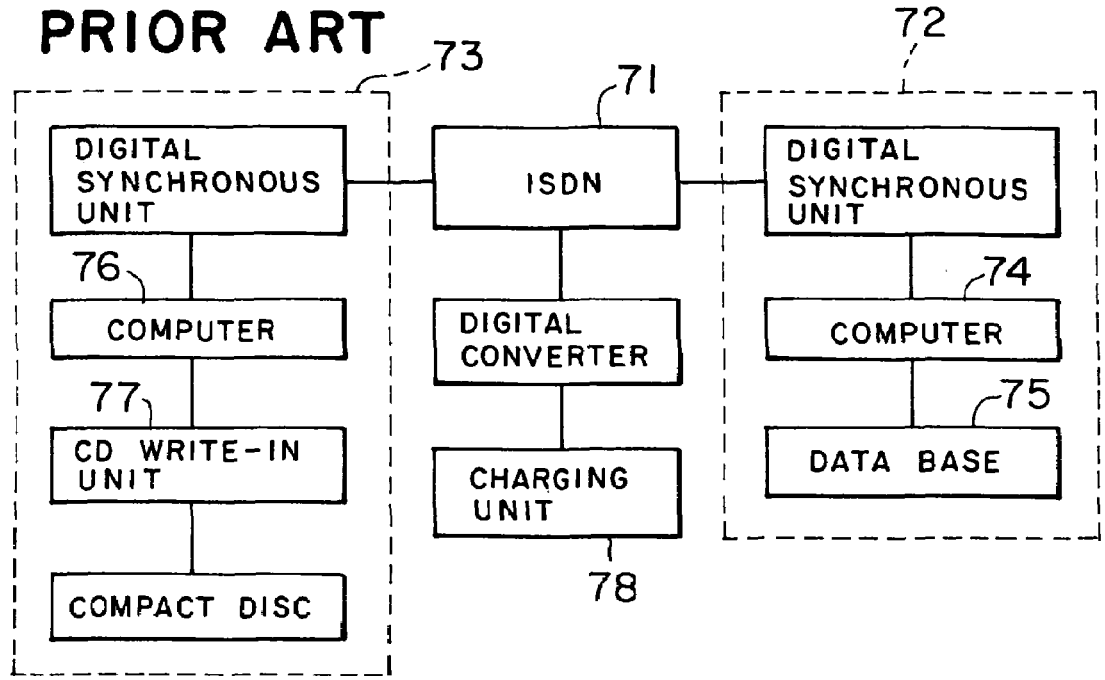
FIG. 26 is a block diagram of a prior art data base utilizing system.
Figure 27:
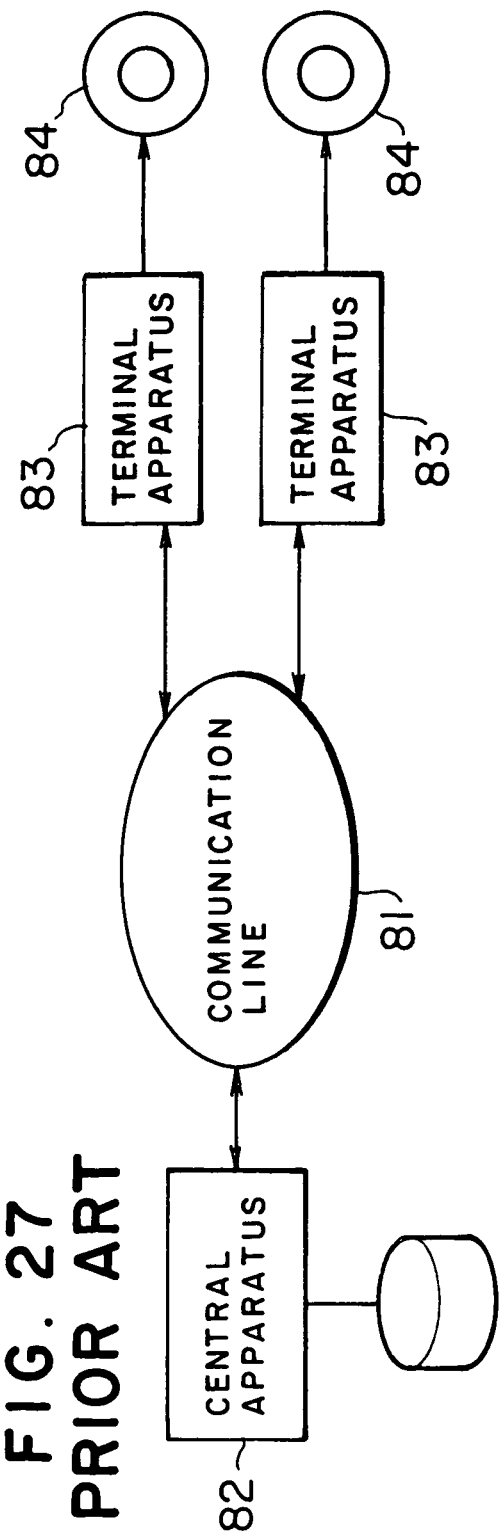
FIG. 27 is a block diagram of an example of a prior art media information distribution system.
Figure 28:
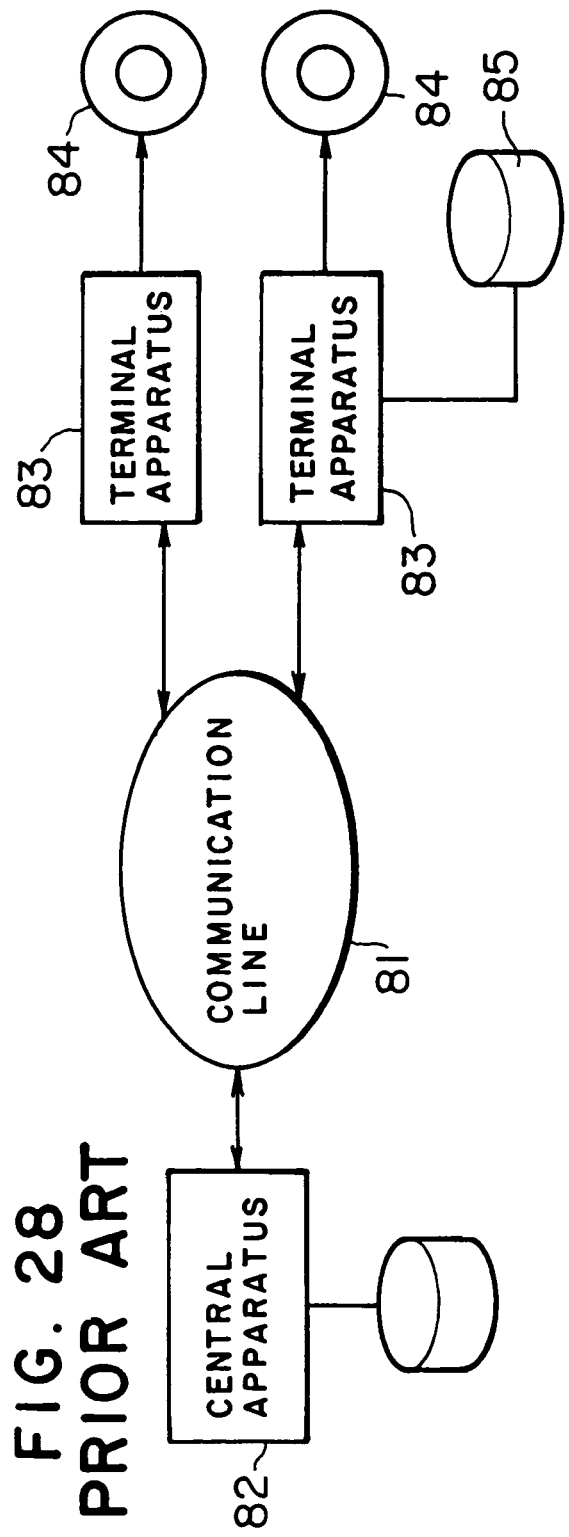
FIG. 28 is a block diagram of another example of a prior art media information distribution system.

In the next Step S42, the system control section 22 has the recording operation instruction unit 21 display a menu as shown in FIG. 25 on the screen 52. When the customer depresses an advance-booking record instruction button for advance booking of the recording of the designated media information in accordance with the guide in the menu, the system control section 22 detects the recording instructions for the advance booking, and outputs a message requesting the customer's desired recording completion time on the screen 52.

Figure 24:
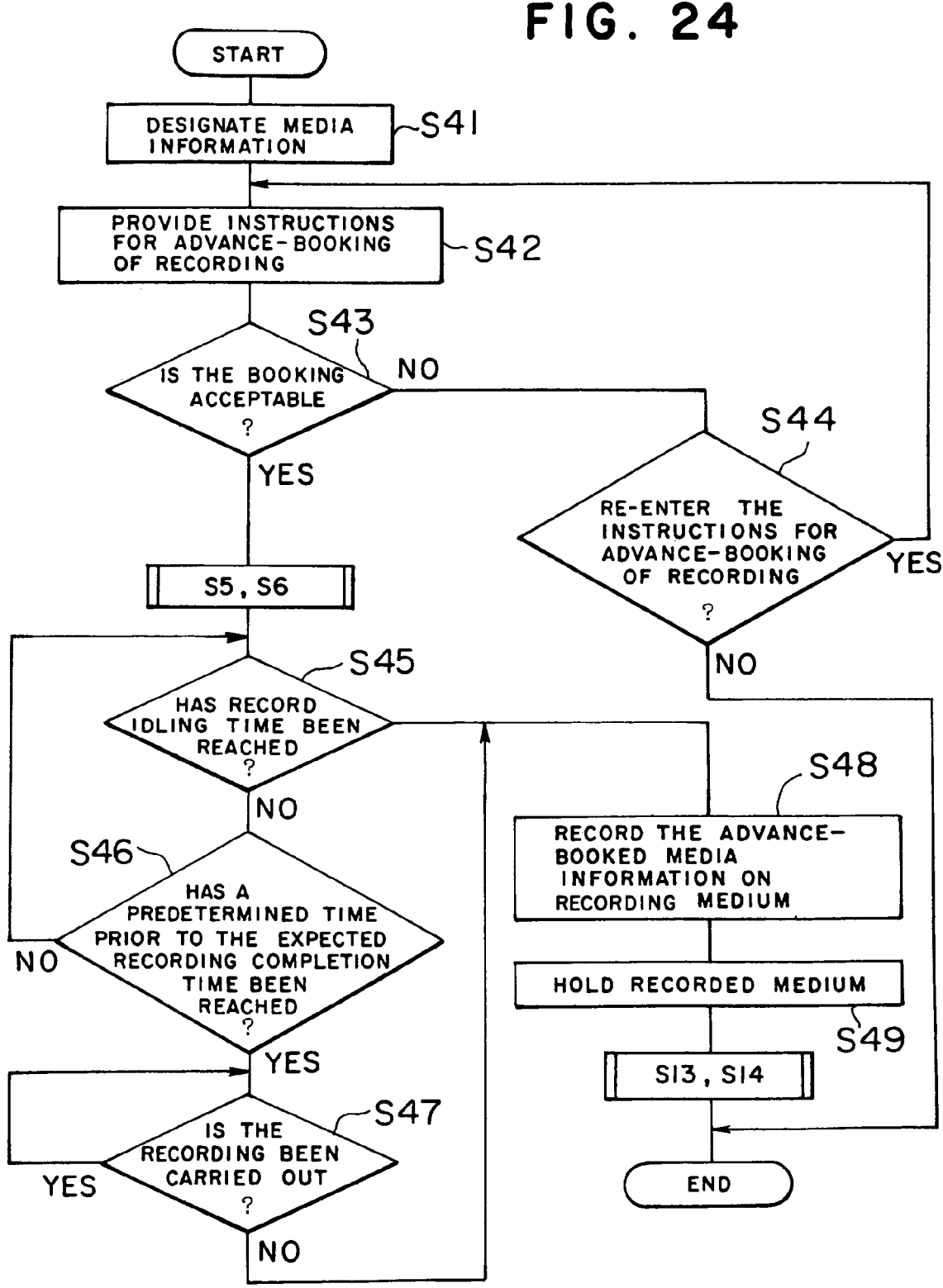
FIG. 24 is a flow chart showing the operation of a third embodiment of the media information distribution and recording system of the present invention.

When the customer's desired recording completion time is input, the system control section 22 detects the customer's desired recording completion time, estimates an expected recording completion time, and judges whether or not the recording instructions are acceptable, for example, by checking whether the customer's desired recording completion time is before or after the estimated expected recording completion time, and also by checking the number of remaining blank recording media (Step S43 in the flow chart in FIG. 24).

When it is judged that the instructions for the advance booking of the recording of the designated media information are not acceptable, that is, when Step S43 in the flow chart in FIG. 24 is No, the judgement is displayed on the screen 52 of the recording operation instruction unit 21, and a question is asked as to whether or not the customer will re-enter the recording instructions (Step S44 in the flow chart in FIG. 24). When the instructions are re-entered, that is, when Step S44 in the flow chart in FIG. 24 is Yes, the flow returns to Step S42. If the instructions are not re-entered, that is, when Step S44 in the flow chart in FIG. 24 is No, the flow ends as shown in the flow chart in FIG. 24.

When it is judged that the instructions relating to the advance booking of the recording of the designated media information are acceptable, that is, when Step S43 in the flow chart in FIG. 24 is Yes, the receipt code thereof is indicated in the same manner as in Example 1, and steps the same as Steps S5 and S6 in the flow chart shown in FIG. 6 are carried out, so that when the designated media information is not stored in the terminal apparatus 3, the designated media information is downloaded from the central apparatus 2 to the terminal apparatus 3.

The system control section 22 monitors whether or not a record idling state wherein all the recordings except the advance-booked recording are completed has been reached, and whether or not a predetermined time before the expected recording completion time has been reached (Step S45→Step S46→Step S45 in the flow chart shown in FIG. 24). The above-mentioned predetermined time is preset in the storage unit 24 as the time required for recording media information, for instance, on two recording media.

When it is judged that the record idling time is reached, that is, when Step S45 in the flow chart shown in FIG. 24 is Yes, the recording of the advance booked media information is carried out in the same manner as in Example 1 (Step S48 in the flow chart shown in FIG. 24). After this step, steps the same as in Example 1 are carried out, provided that the announcement of the completion of the recording as in Example 1 (Step S12 in the flow chart shown in FIG. 6) is unnecessary. Even if the record idling time is not reached, that is, even if Step S45 in the flow chart shown in FIG. 24 is No, when the above-mentioned predetermined time is reached, that is, when Step S46 in the flow chart shown in FIG. 24 is Yes, the recording of the advance booked media information is carried out (Step S48 in the flow chart shown in FIG. 24) after the completion of the preceding recording (Step S47 in the flow chart shown in FIG. 24 is No).

In this embodiment, the advance booked media information can be recorded during the record idling time, so that the recording of on-the-spot ordered media information can be carried out speedily. Furthermore, in this embodiment, the advance booking can be made, using the remote terminal apparatus 3 or information equipment such as a telephone, provided that when the advance order is made using a telephone, the receipt code and the re-ordering instructions are input vocally.

EXAMPLE 4

With reference to the flow chart shown in FIG. 29, the operation of a fourth embodiment of the media information distribution and recording system of the present invention will now be explained.

Figure 29:
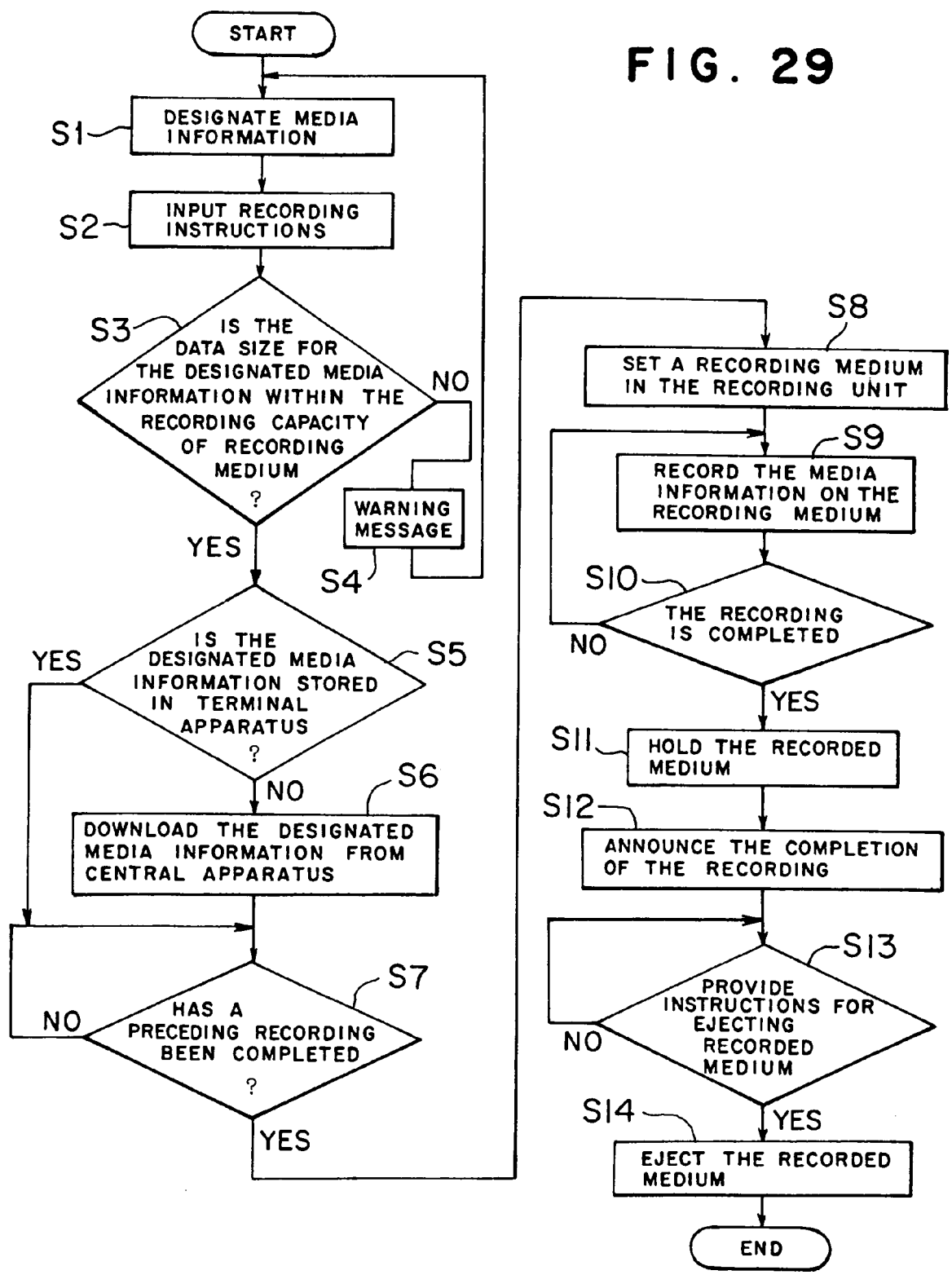
FIG. 29 is a flow chart showing the operation of a fourth embodiment of the media information distribution and recording system of the present invention.

In this embodiment, the system control section 22, on receiving recording instructions, determines the total data size for the recording instructions with reference to the media information list shown in FIG. 11, so that whether or not the data size for the media information to be recorded is within an effective recording capacity of one recording medium is checked (Step S3 in the flow chart shown in FIG. 29).

When the data size is found to exceed the effective recording capacity of one recording medium, that is, when Step S3 in the flow chart shown in FIG. 29 is No, the system control section 22 has the recording operation instruction unit 21 display a warning message indicating that the capacity is exceeded, and the flow returns to Step S1 in the flow chart shown in FIG. 29.

When the data size is found to be within the effective recording capacity of one recording medium, that is, when Step S3 in the flow chart shown in FIG. 29 is Yes, steps the same as those in the first embodiment are carried out, which are shown in the flow chart in FIG. 6.

Figure 30:
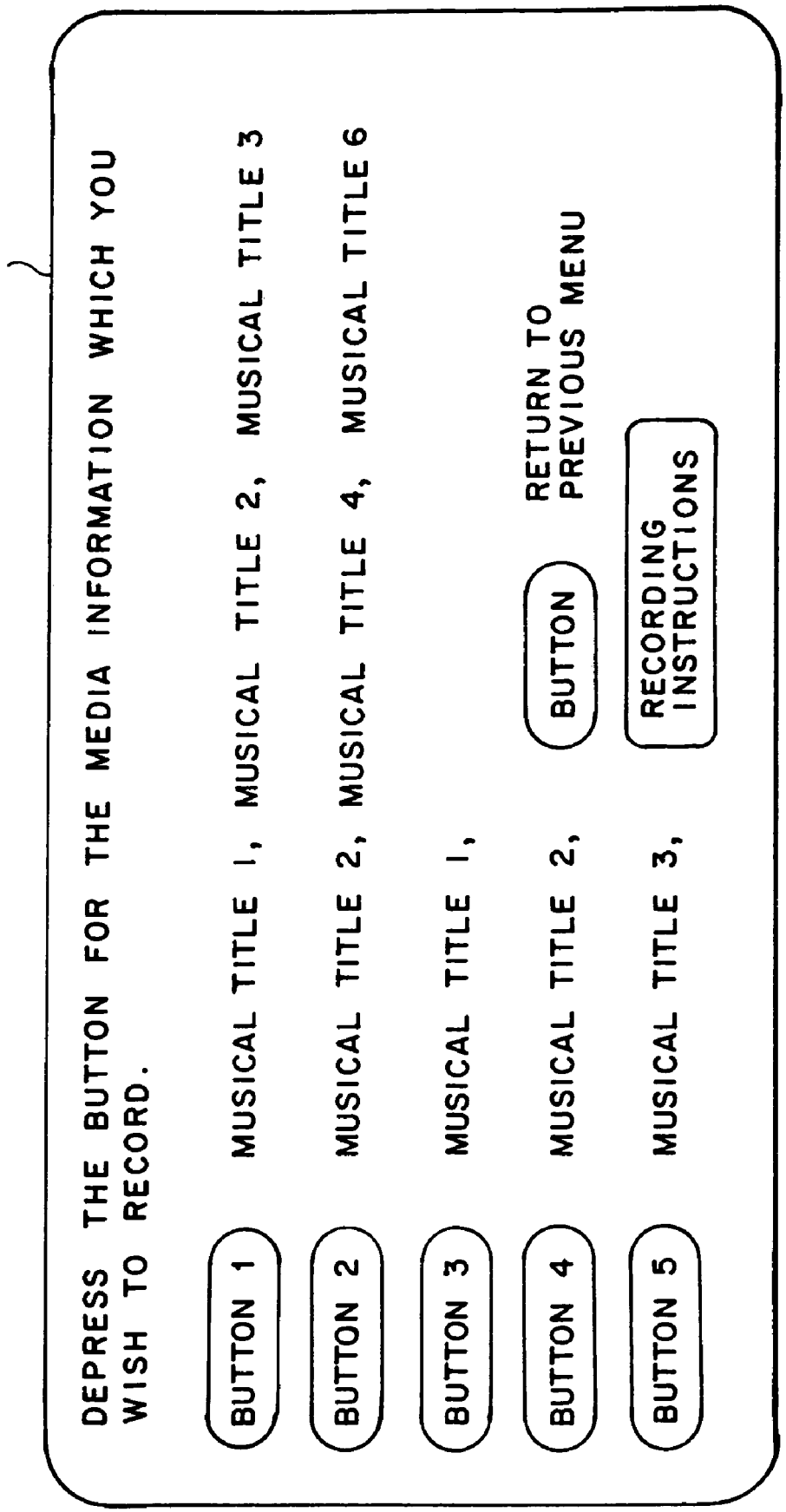
FIG. 30 is a schematic illustration of a further example of a menu displayed on a screen of the recording operation instruction unit.

In this embodiment, for example, when music is designated in the menu display as shown in FIG. 8, and then a certain singer is designated in a succeeding menu (not shown), a menu as shown in FIG. 30 is displayed on the screen 52. In this menu, for example, button 1 corresponds to the singer's top three pops with title 1, title 2, and title 3, button 2 corresponds to the singer's newest three pops, with title 4, title 5 and title 6, so that a plurality of musical information items can be designated by one designation. For instance, by depressing the button 1, all top three pops with title 1, title 2, and title 3 can be designated at one time. Thus, in this embodiment, the step of designating a plurality of media information items is significantly simplified.

Furthermore, in this embodiment, the inner holding media information list as shown in FIG. 13 can be made to correspond to the menu as shown in FIG. 30, with respect to each title, so that, for example, musical compositions which are top-N such as top-ten in terms of the number of recordings in various categories can be displayed by one designating operation on the screen 52 of the recording operation instruction unit 21.

Thus, in this embodiment, a plurality of media information items to be recorded on one recording medium can be designated and recorded on the recording medium, and the recorded medium can be ejected by the above-mentioned simple method. When the total data size for the designated media information to be recorded exceeds the effective recording capacity of the one recording medium, the notice warning that the capacity is exceeded is given to the customer.

Furthermore, the number of recordings of each medium information item in the terminal apparatus 3 is counted, and the counted number of recordings can be displayed by the customer. The media information items which are top hit groupings such as the top ten in terms of the number of recordings can be recorded at one time by one simple operation performed by the customer, and the media information item which is number-one in terms of the number of recordings can also be recorded from simple recording instructions.

Furthermore, by providing number counting means for counting the number of recordings of each media information item in the terminal apparatus 3 for recording the media information on the recording medium, and also recording number transmitting means for transmitting the number of recordings counted by the recording number counting means to the central apparatus 2 in such a manner that the number of recordings counted is made to correspond to a recording code or a title for each item of media information counted, the customer's favorite media information, or what media information is currently popular, can be assessed with high accuracy.

Furthermore, the terminal apparatus 3 can be provided with category-based totaling means for totaling the counted number of recordings, categorized, for instance, in accordance with the kind of music, such as pops and classics, and artist, and for displaying the category-based totaling results.

EXAMPLE 5

With reference to the flow chart shown in FIG. 31, the operation of a fifth embodiment of the media information distribution and recording system of the present invention will now be explained.

In this embodiment, the structure of the terminal apparatus 3 is substantially the same as that of the terminal apparatus 3 employed in Example 1 except that at least part of the media information designated can be auditioned for critical listening before recording the media information.

Figure 31:
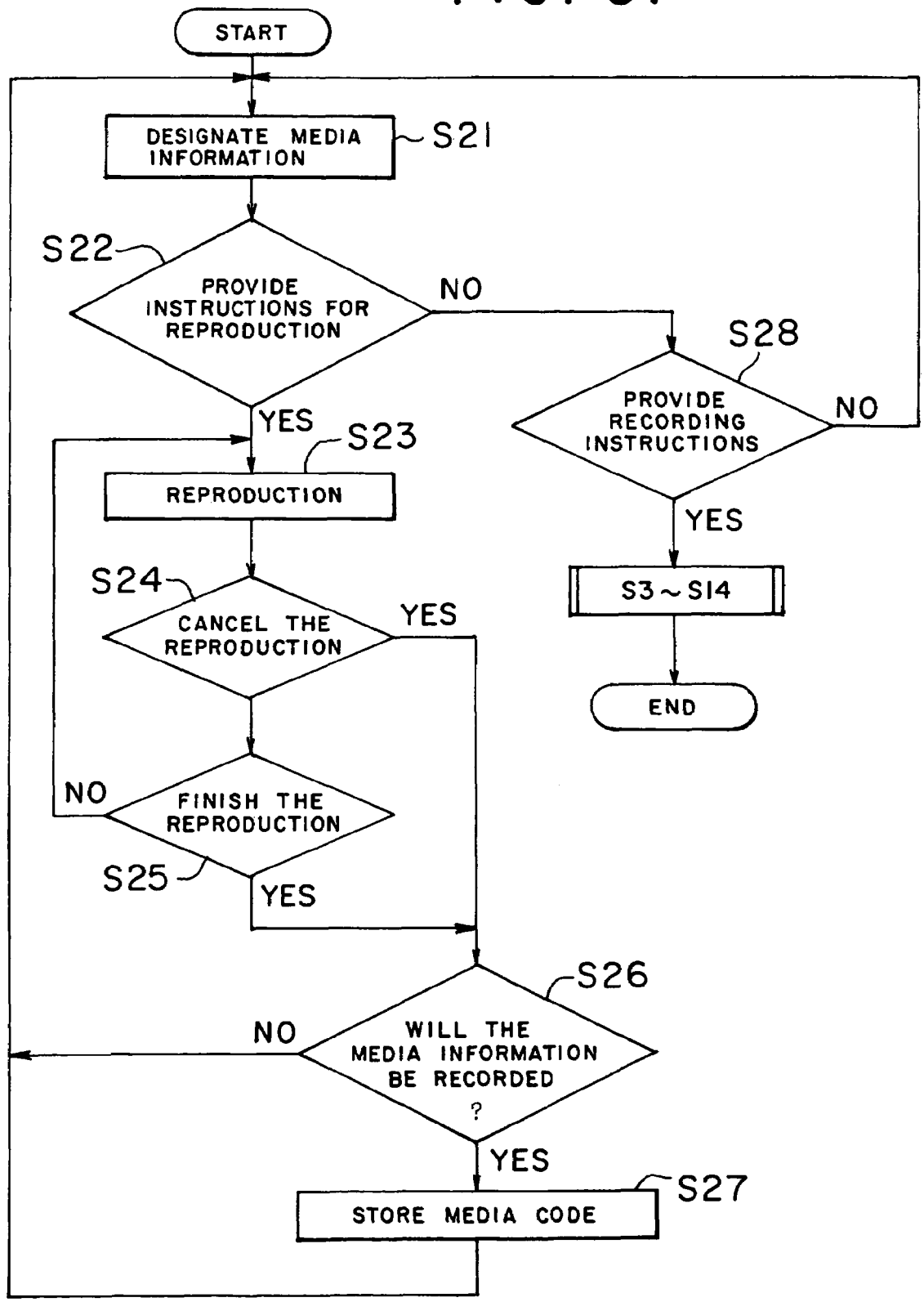
FIG. 31 is a flow chart showing the operation of a fifth embodiment of the media information distribution and recording system of the present invention.

In the flow chart shown in FIG. 31, the media information to be recorded is designated in Step S21 in the same manner as in Step 1 in the flow chart shown in FIG. 6 in Example 1. At this moment, the menu as shown in FIG. 32 is displayed on the screen 52, which corresponds to the menu as shown in FIG. 9.

Figures 32, 33:
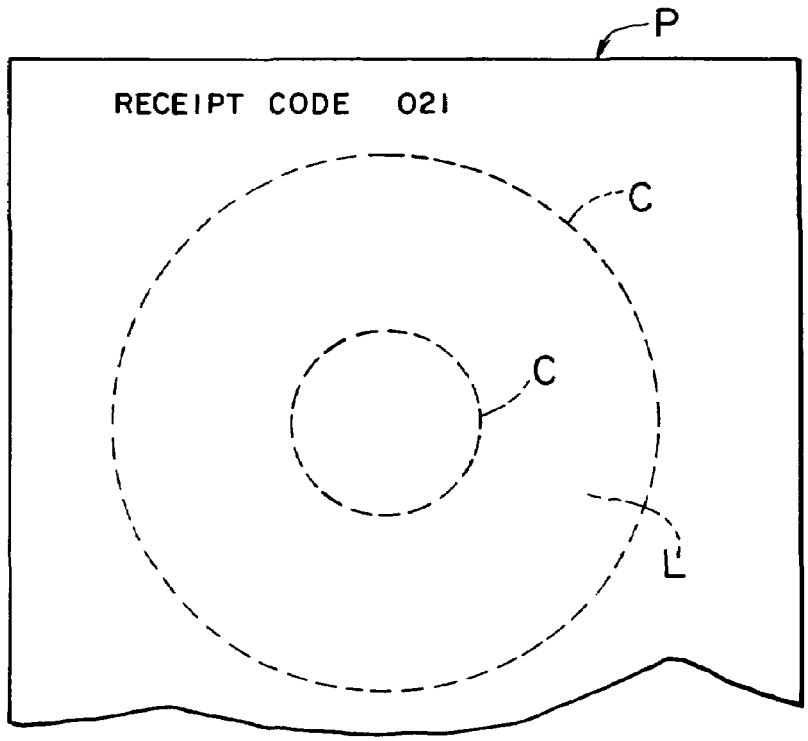
FIG. 32 is a schematic illustration of a further example of a menu displayed on a screen of the recording operation instruction unit.
FIG. 33 is a schematic illustration of a special printing sheet P for use in the present invention.

In the menu shown in FIG. 32, the audition button is added. When an audition is requested, that is, when Step S22 in the flow chart in FIG. 31 is Yes, the audition button is depressed, whereby the system control section 22 has the designated media information downloaded and the reproduction is made in the form of acoustic output in Step S23.

As shown in the menu in FIG. 32, a cancel button is provided for discontinuing the reproduction. For example, when the designated media information is not stored in the terminal apparatus 3 and it takes a long time to download the designated media information from the central apparatus 2, the audition can be canceled before the reproduction is started, or the reproduction can be discontinued when the contents of the media information item have been confirmed.

When the reproduction is discontinued, that is, when Step S24 in the flow chart shown in FIG. 31 is Yes, or when the reproduction is finished, that is, when Step 25 in the flow chart shown in FIG. 31 is Yes, the system control section 22 causes the recording operation unit 21 to determine whether or not the reproduction-requested media information is recorded in the recording medium. When the system control section 22 obtains the recording instructions, that is, when Step S26 in the flow chart in FIG. 31 is Yes, the system control section 22 stores the media code requested by the customer (Step 27 in the flow chart shown in FIG. 31).

When the reproduction-requested media information is not recorded, that is, when Step S26 in the flow chart shown in FIG. 31 is No, or when the media code for the media information to be recorded has been stored, the flow returns to Step S21 in the flow chart shown in FIG. 31 and the system control section 22 has the menu shown in FIG. 32 displayed once again. When another media information item is to be designated, necessary instructions are made with reference to the menu shown in FIG. 32 or other menus (not shown), so that when the recording instruction button is depressed, that is, when Step S28 in the flow chart shown in FIG. 31 is Yes, the same steps as Steps S3 to S14 in FIG. 6 are carried out and the designated media information is recorded in the recording medium.

In this embodiment, for instance, when the customer cannot determine the contents of the media information by referring to the name of the media information item, the contents of the media information item can be confirmed by the audition thereof. The customer can discontinue the audition as desired.

EXAMPLE 6

A sixth embodiment of the media information distribution and recording system of the present invention will now be explained.

In this embodiment, the structure of the terminal apparatus 3 is substantially the same as that of the terminal apparatus 3 employed in Example 1 to Example 5 except that a plurality of special printing sheets P as shown in FIG. 33 is set in the printer 28, and label information, such as the title, artist, composer, lyric writer in the case of pops, can be printed on a label sheet portion L of the special printing sheet P.

The special printing sheet P is temporarily secured with glue on a disposable base sheet and comprises a ring-shaped label sheet portion L which can be cut off along the two concentric perforated lines and peeled off the disposable base sheet.

The customer can print the label information L on the ring-shaped label sheet portion L, peel the printed label sheet portion L away from the disposable base sheet, and apply the printed label sheet portion L to the recording medium.

In this embodiment, the above-mentioned label information can be downloaded from the central apparatus 2 to the terminal apparatus 3 as part of each media information item. When the media information is recorded in the recording medium, the system control section 22 separates the label information from the media information, transfers the media information without the label information to the recording unit 26, and formats the separated label information in a particular format, then lays out the same on a memory within the system control section 22 so as to print the label information at a particular location on the special printing sheet P.

Thus, when the media information is recorded in the recording medium, the label information thereof is transferred to the printer 28, and is printed on the label sheet portion L of the special printing sheet P. The special printing sheet P is discharged onto a discharge tray (not shown) of the printer 28. The customer's receipt code is printed in an area outside the label sheet portion L as shown in FIG. 33, so that the customer can correctly receive his or her special printing sheet P for the media information recorded.

EXAMPLE 7

A seventh embodiment of the media information distribution and recording system of the present invention will now be explained.

Figure 34:
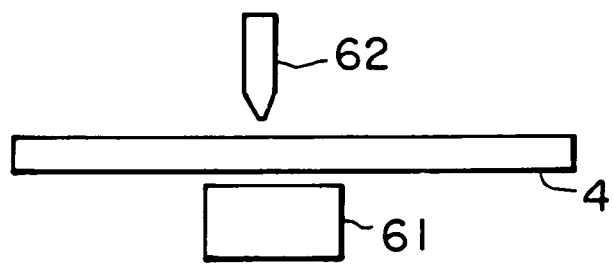
FIG. 34 is a schematic cross-sectional view of recording means disposed below the recording medium, and an ink-jet printing nozzle 62 disposed above the recording medium for use in the present invention.

In this embodiment, the structure of the terminal apparatus 3 is substantially the same as that of the terminal apparatus 3 employed in Example 6 except that the media information can be recorded on the recording medium 4 by recording means 61 of the recording unit 26. The recording means 61 is disposed below the recording medium 4, and the label information can be directly printed on the surface of the recording medium 4 by an ink-jet printing nozzle 62 which is disposed above the recording medium 4 as shown in FIG. 34.

EXAMPLE 8

An eighth embodiment of the media information distribution and recording system of the present invention will now be explained.

Figure 35:
FIG. 35 is a schematic illustration of the structure of media information data for use in the present invention.

In this embodiment, the structure of the terminal apparatus 3 is substantially the same as that of the terminal apparatus 3 employed in Example 6 except that media information data with the structure as shown in FIG. 35 is used.

Figure 36:
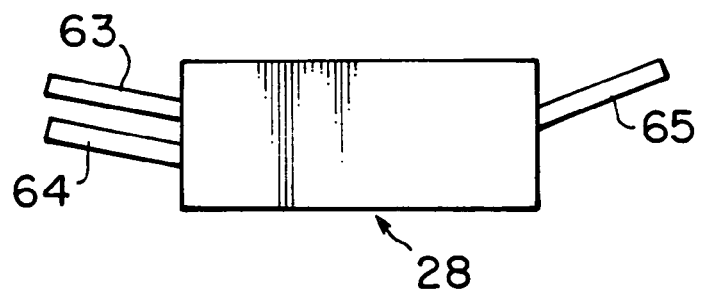
FIG. 36 is a schematic cross-sectional view of an example of a printer for use in the present invention.

In this embodiment, the media information to be recorded on the recording medium is downloaded from the central apparatus 2, with the addition of the label information and words or lyrics to the media information. For example, as shown in FIG. 36, the printer 28 is provided with a first sheet feeding tray 63 for feeding the special printing sheets, and a second sheet feeding tray 64 for feeding sheets of plain paper. The label information and words or lyrics are respectively arranged in predetermined formats and are transferred to the printer 28. The label information is printed on the special printing sheet P, and the completed special printing sheet P is discharged onto a discharge tray 65. The words or lyrics are printed on the plain paper sheet and the printed plain paper sheet is discharged onto the discharge tray 65.

As in the case of the output of the label information, the words or lyrics are printed together with the receipt code, so that the customer can correctly pick up his or her label sheet and words or lyrics sheet from the discharge tray 63 with reference to the receipt code.

The label information and the words or lyrics information can be recorded on the recording medium 4. In this case, the media information with the structure as shown in FIG. 35 is transferred, as is, to the recording unit 26 and is recorded by the recording unit 26. Alternatively, the label information and/or the words or lyrics information is re-edited and recorded in the recording medium 4 after or prior to the recording of a plurality of media information items to be recorded. In this case, the customer must output the label information or the words or lyrics information recorded in the recording medium 4, using his or her print-out apparatus.

EXAMPLE 9

A ninth embodiment of the media information distribution and recording system of the present invention will now be explained.

In this embodiment, the structure of the terminal apparatus 3 is substantially the same as that of the terminal apparatus 3 employed in Example 6 except that not only the characters, but also an image can be included in the label information, as the customer desires.

Figure 37:
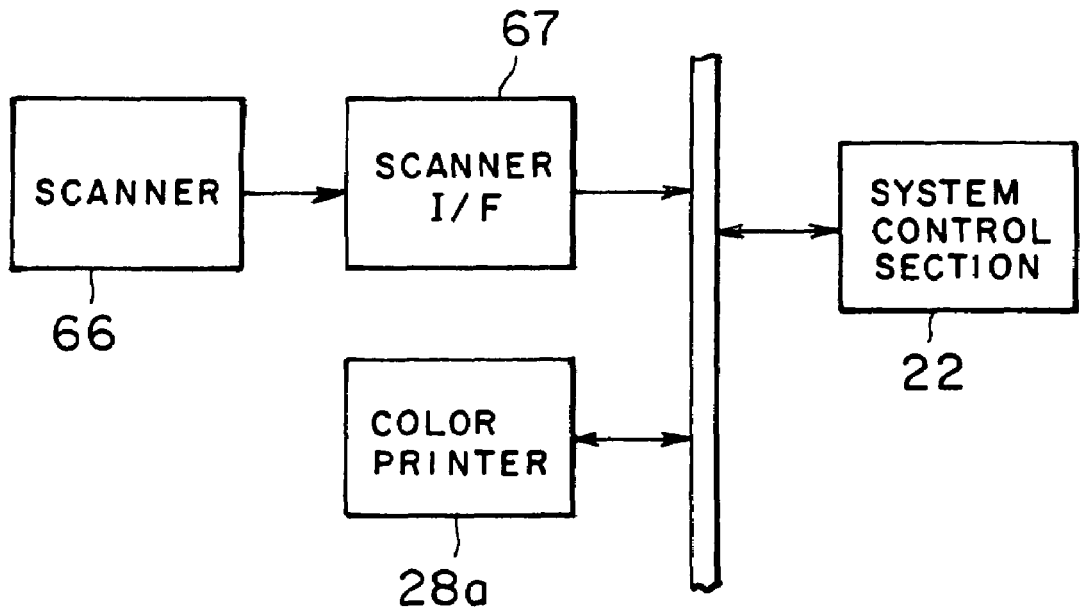
FIG. 37 is a block diagram of a terminal apparatus for use in the present invention, which is provided with an ink-jet type color printer, and a scanner 66.

As shown in FIG. 37, in this embodiment, the terminal apparatus 3 is provided with an ink-jet type color printer 28a as the printer 28, and a scanner 66 as image input means, so that the customer's color image can be input to the scanner 66. The color image is converted to digital color data through a scanner interface section 67, so that the digital color data is transferred to the color printer 28a. A label containing character information and image information is formed on the label sheet by the color printer 28a. Alternatively, the recording unit 26 can be provided with color ink-jet printing means for directly forming a label containing character information and image information on the surface of the recording medium 4.

In the above, instead of the scanner 66, a digital still camera (not shown) can be employed.

EXAMPLE 10

A tenth embodiment of the media information distribution and recording system of the present invention will now be explained.

Figure 38:
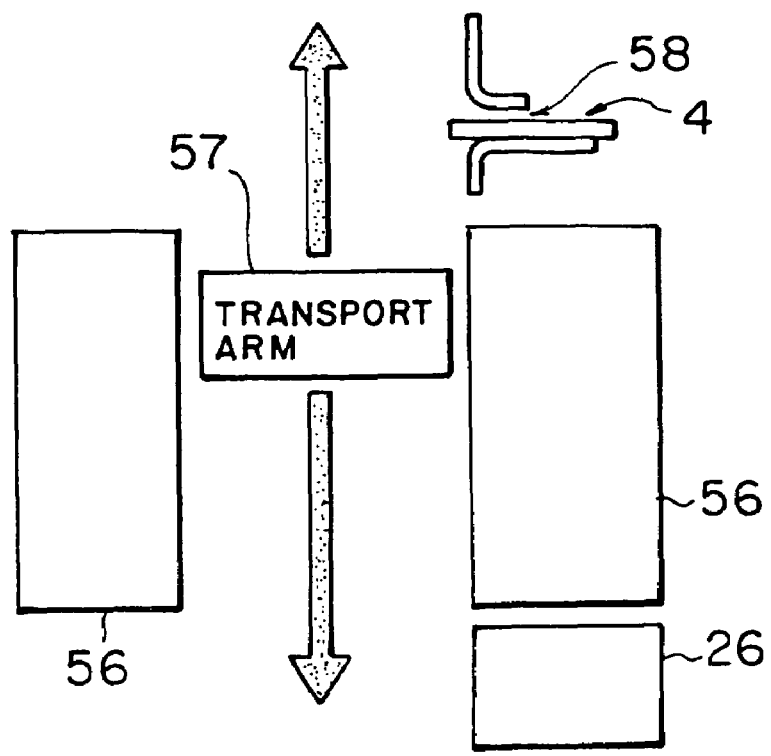
FIG. 38 is a schematic illustration of a recording medium inlet and outlet for the terminal apparatus of the present invention in explanation of the recording medium inlet and outlet.

In this embodiment, the structure of the terminal apparatus 3 is substantially the same as that of the terminal apparatus 3 employed in Examples 1 to 10 except that the terminal apparatus 3 is provided with a recording medium inlet and outlet 58 through which the customer can eject the recorded recording media 4 and insert his or her recording media 4 such as a CD for recording the media information thereon as shown in FIG. 38.

When issuing recording instructions, when the customer can insert his or her recording medium 4 such as a CD into the recording medium inlet and outlet 58 in accordance with the answer to a question as to whether or not the customer wishes to record the designated media information on his or her own recording medium 4, whereupon the insertion of the recording medium 4 is detected by a sensor (not shown) disposed near the recording medium inlet and outlet 58. The transport arm 57 is then moved to the recording medium inlet and outlet 58 to accept the inserted recording medium 4, obtains a vacant address of the cartridge 56 with reference to the address administration tables as shown in FIG. 16 and FIG. 17, sets the recording medium 4 at the address, and writes the receipt code in the column "Status of CD" in the address administration tables as shown in FIG. 16 and FIG. 17.

The designated media information is recorded on the customer's recording medium in the same manner as in Example 1, provided that in producing the recording, the amount of recordable capacity remaining in the customer's recording medium is checked with reference to the previously recorded area therein, and the recording of the designated media information is carried out in an unrecorded area.

In the case where the remaining recordable capacity is insufficient to record the customer's designated media information in its entirety, the media information is recorded as far as possible in terms of media information unit on the customer's recording medium and a notice to that effect is printed, for instance, on the printing sheet for the label.

Alternatively, when initiating the recording, a check is made to determine whether or not the customer's designated media information can be recorded in its entirety on the customer's recording medium, and if it is found impossible to record the customer's designated media information in its entirety, recording is not performed. A notice to that effect, together with the receipt code, is displayed on a display unit for the recording operation instruction unit 21 or for the terminal apparatus 3.

Thus, in this embodiment, the customer can make full use of his or her recording media.

EXAMPLE 11

With reference to the flow chart shown in FIG. 39, the operation of an eleventh embodiment of the media information distribution and recording system of the present invention will now be explained.

The flow chart in this embodiment is the same as the flow chart shown in FIG. 6 in Example 1 except that Steps S12, S13 and S16 are added to the flow chart shown in FIG. 6.

The media information list for this embodiment includes the price to be charged to the customer for each media information item, together with the corresponding media code thereof, as shown in FIG. 40.

Figure 39:
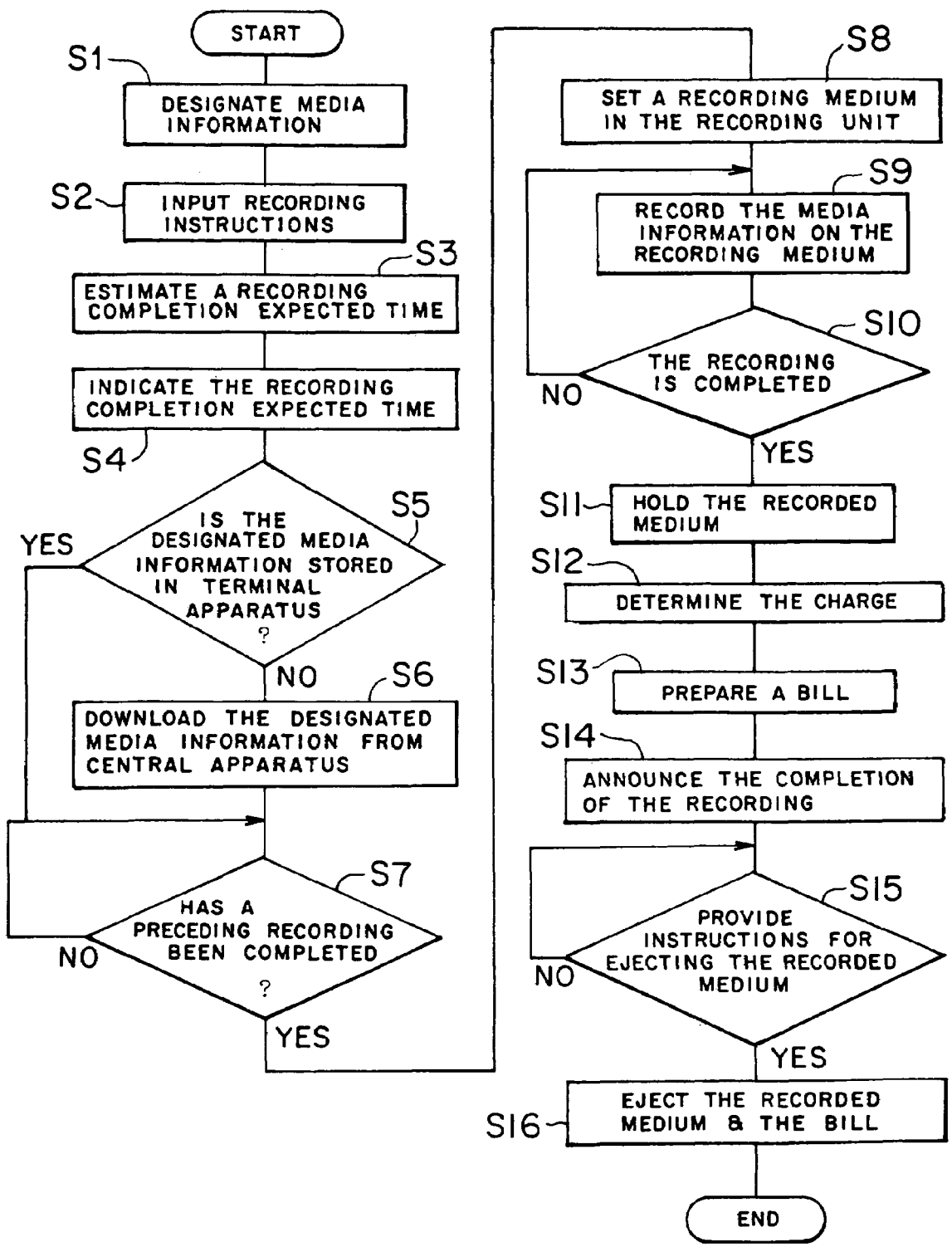
FIG. 39 is a flow chart showing the operation of an eleventh embodiment of the media information distribution and recording system of the present invention.

The system control section 22 determines the charge for recording the media information item designated by the customer (Step S2 in the flow chart shown in FIG. 39). More specifically, the cost for recording each media information item is determined with reference to a media information list as shown in FIG. 40, and then the charge is determined by totaling the cost for recording each media information item.

The system control section 22 collects the data for a bill for the charge, including the corresponding receipt codes, transfers the data for the bill to the printer 28 and causes the printer 28 to print the data on a bill sheet, whereby the bill is prepared (Step S13 in the flow chart shown in FIG. 39).

As shown in FIG. 41, the bill includes the cost for each media information item recorded. The system control section 22 obtains the title of each media information item from the media information list, and includes the titles in the bill.

Steps S12 and S13, and Steps S8 to S11 can be independently carried out.

Since the recorded medium can be ejected by inputting the receipt code thereof, the customer can receive the correct recorded medium without fail. The bill for the recorded medium can also be ejected together with the recorded medium by inputting the receipt code thereof.

Furthermore, payment for the charge can be made in cash with reference to the charge displayed on a cash register. The customer can confirm the charge in advance through a charging system using a network.

When the recording is ordered, a ticket indicating the receipt code and the expected recording completion time is issued to the customer. The customer can confirm whether or not the correct bill is issued by reference to both the receipt code printed on the bill and the receipt code printed or recorded on the ticket.

Furthermore, the system control section 22 can also determine the total number of recording media used, for instance, for the past month.

Furthermore, the system control section 22 can determine the changes in the total number of recorded media or the total number of recording operations on a monthly basis, whereby the customer's need can be assessed, and the cumulative number of recorded media calculated on a monthly basis can be used as information for maintenance of the terminal apparatus 3.

The above data, with a statistical analysis of monthly changes in the number calculated above and the dispersion thereof, can also be used for improvement of the media information distribution and recording system of the present invention.

Furthermore, the write-in time required for recording the media information on one recording medium can be determined, for example, by measuring the time period from a write-in initiating time T1 at which instructions are given for moving the transport arm 57 to set a blank recordable CD in the recording unit 26 (for example, Step S8 in the flow chart shown in FIG. 6) through a write-in completion time T2 at which the write-in is completed, the recorded CD is returned to the cartridge 56, and the system control section 22 receives notice to that effect, that is, by measuring the time period of T2-T1.

Figure 42:
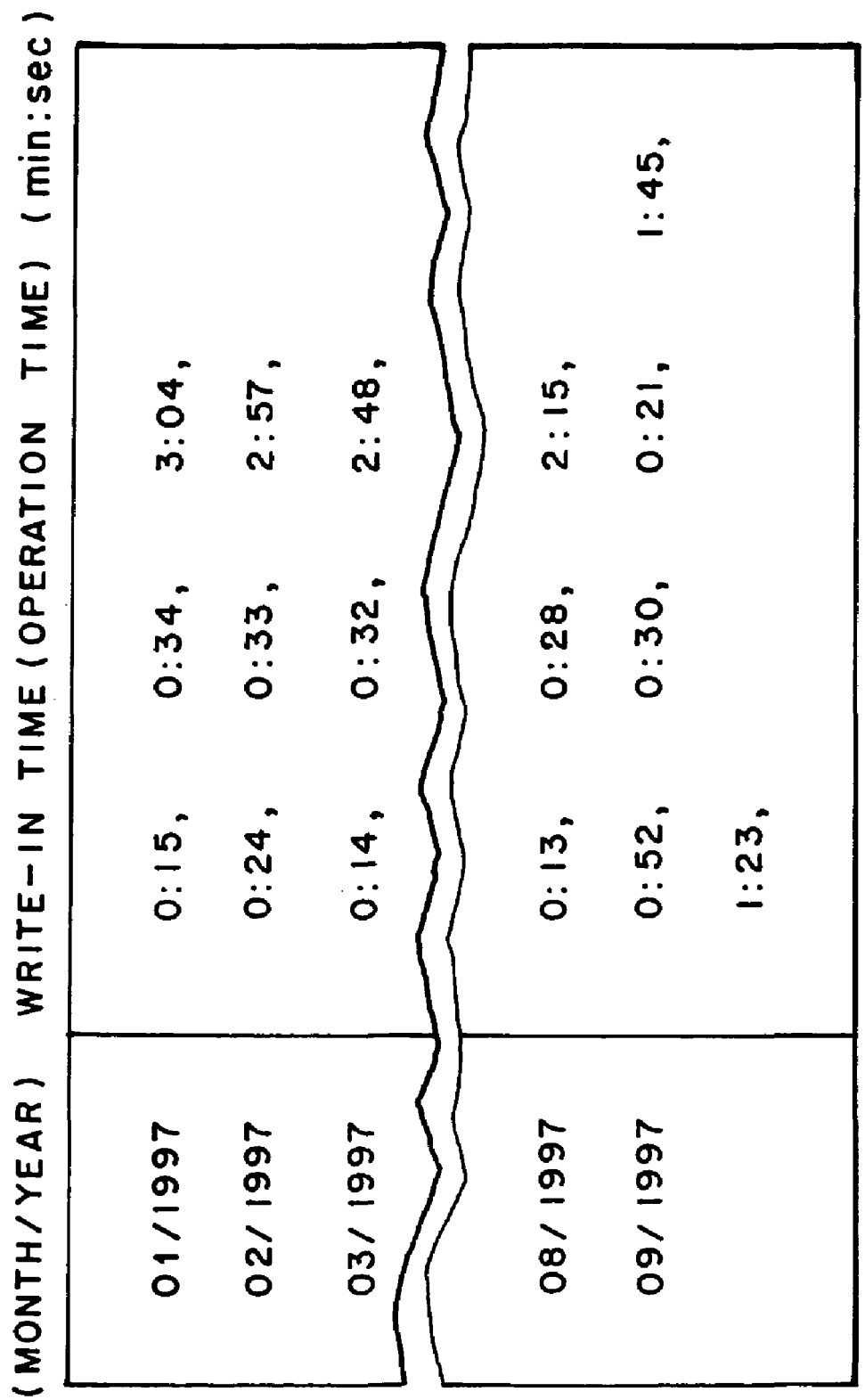
FIG. 42 is a schematic partial illustration of a table for use in the present invention, which stores measured write-in time data.

The above measured write-in time data can be stored and administered, for example, in the form of the table shown in FIG. 42.

EXAMPLE 12

With reference to the flow chart shown in FIG. 43, the operation of a twelfth embodiment of the media information distribution and recording system of the present invention will now be explained.

Figure 43:
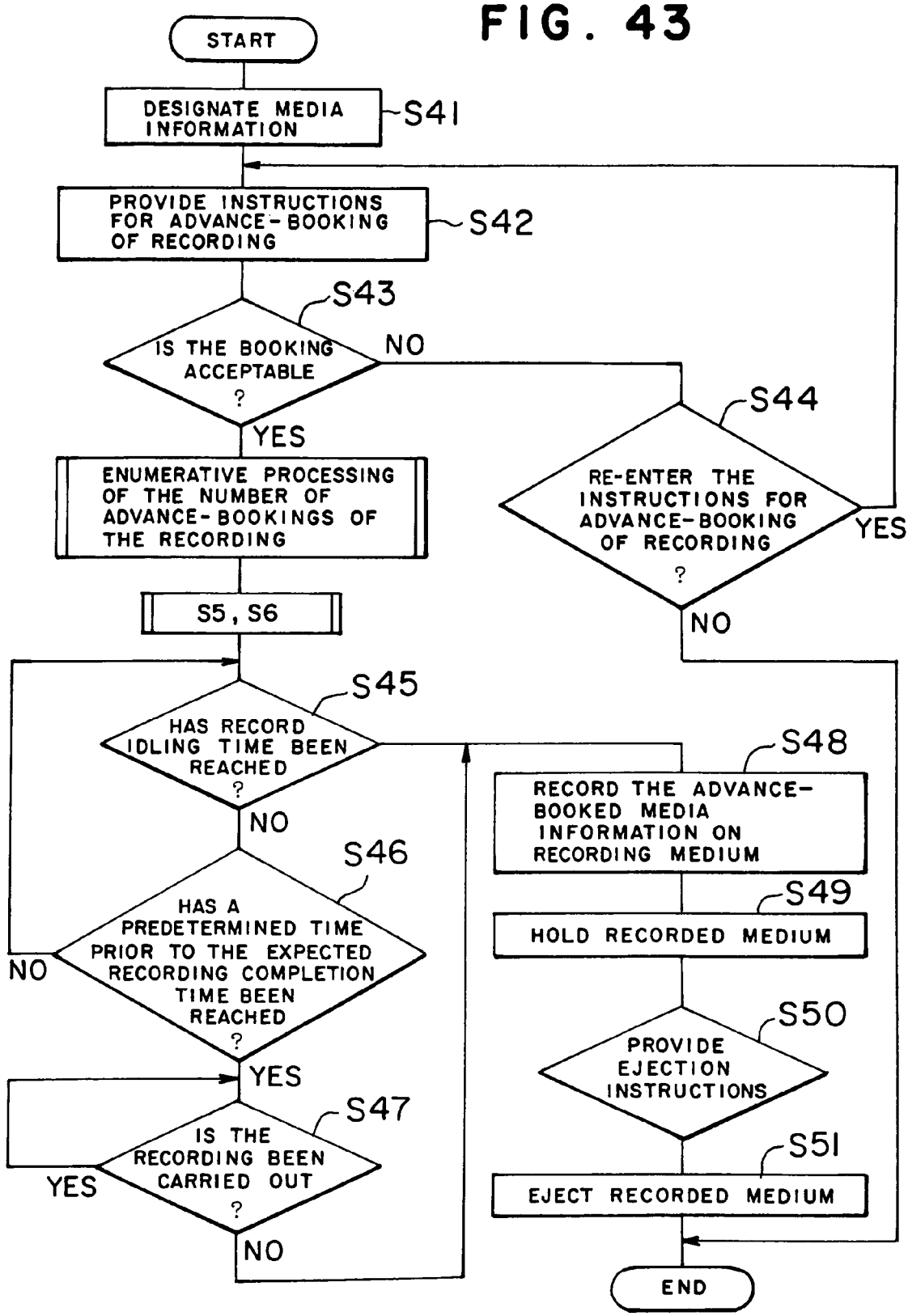
FIG. 43 is a flow chart showing the operation of a twelfth embodiment of the media information distribution and recording system of the present invention.

This embodiment is substantially the same as the third embodiment in Example 3 except that the step of performing enumerative processing of the number of advance-bookings of the recording is added after Step S43 as shown in the flow chart in FIG. 43.

The number of advance-bookings of the recording counted can also be administered and statistically processed in this embodiment.

Figure 44:
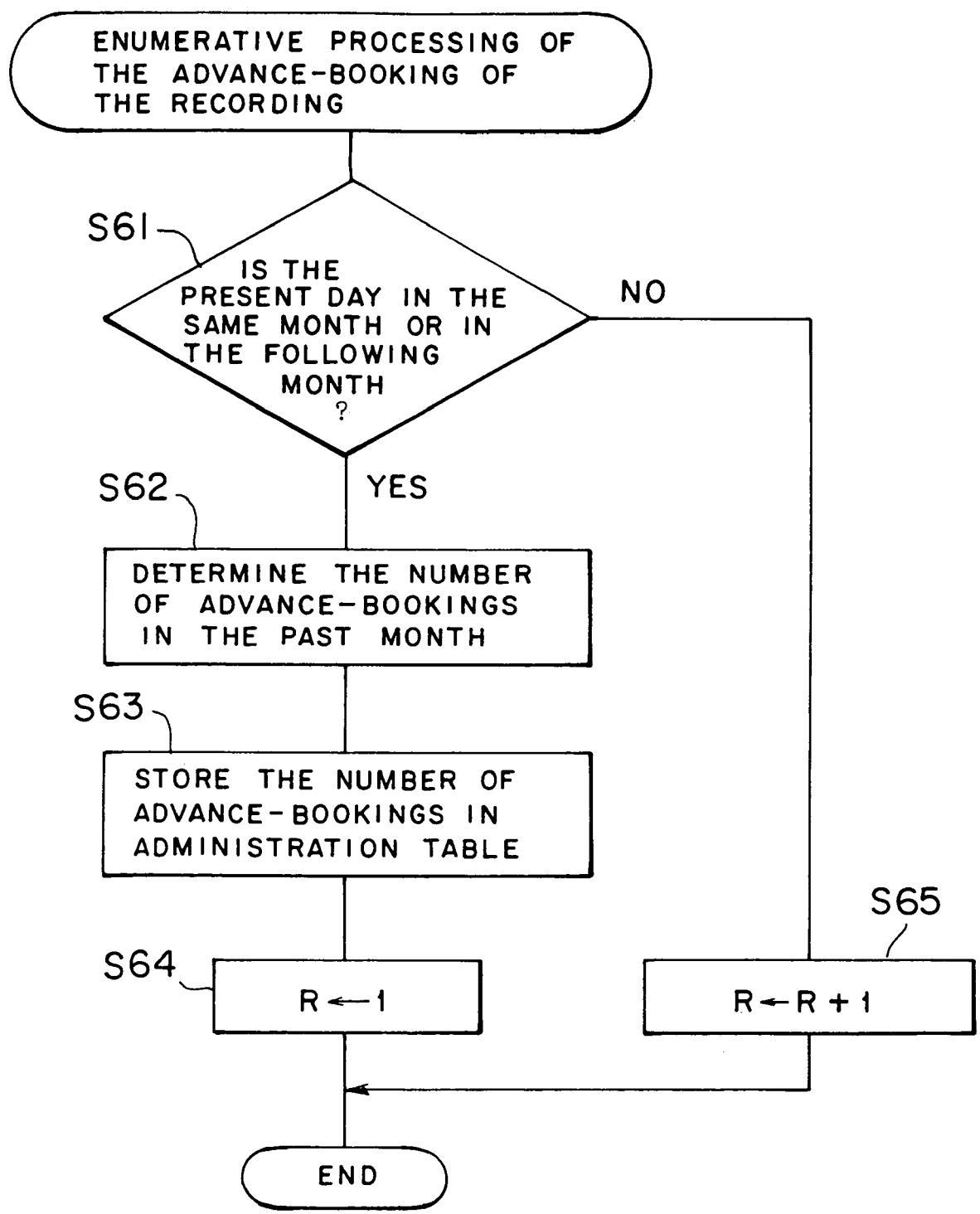
FIG. 44 is a flow chart for the operation of an enumerative process of the number of advance-bookings of the recording on a monthly basis for use in the present invention.

For example, FIG. 44 shows the flow chart for the operation of the enumerative process of the number of advance-bookings of the recording on a monthly basis.

In Step S61 in the flow chart shown in FIG. 44, the present date and time are compared with the past date and time at which the number of advance-bookings was previously stored in a predetermined area in a RAM to judge whether or not the present date is still in the same month as the past date, or is in the following month.

When the present date is still in the same month as the past date, that is, when Step S61 in the flow chart shown in FIG. 44 is No, the number of advance-bookings stored in the predetermined area in the RAM is increased by one as shown in Step S65 in the flow chart shown in FIG. 44, and the procedure passes through this flow.

When the present date is in the following month, that is, when Step S61 in the flow chart shown in FIG. 44 is Yes, the total number of advance-bookings in the past month, R, is determined as shown in Step S62 in the flow chart shown in FIG. 44. The number is then stored in a monthly advance-booking administration table (not shown), as shown in Step S63 in the flow chart shown in FIG. 44. As the number of advance-bookings for the present month, R, 1 is set and stored in the predetermined area in the RAM, and the procedure passes through this flow.

In this embodiment, lead time which is defined a period of time from a booking reception time at which the booking is accepted through the recording completion time booked can be measured.

The lead time can be stored in a lead time table (not shown) which is similar to the table as shown in FIG. 42, and can be administered.

Furthermore, a reception time gap can also be determined, which is defined as a time gap between the recording completion time booked and an actual receiving time at which the recording medium on which the designated specified media information is recorded is actually received by a customer.

The reception time gap can also be stored in a reception time gap table (not shown) which is similar to the table as shown in FIG. 42, and can be administered.

In the present invention, as the detachable recording medium 4, for example, CD-R, CD-RW, MD, cassette tape, and memory card can be employed.

Furthermore, when the media information is transmitted through a network or stored, for example, MP3, TwinVQ method, and JPEG method can be employed.

As the recording medium which stores the program that controls a computer for use in the present invention, not only ROM, but also, for example, CD-R, CD-RW, MD, cassette tape, and memory card can be employed. Such a detachable recording medium can be set in a read out apparatus, and can be stored in a RAM or a hard disc for the recording apparatus.

Japanese Patent Application No. 9-218134 filed Jul. 28, 1997, Japanese Patent Application No. 9-316140 filed Nov. 2, 1997, and Japanese Patent Application No. 9-316141 filed Nov. 2, 1997 are hereby incorporated by reference.

What is claimed is:

1. A media information distribution and recording system for distributing media information from a central apparatus to a terminal apparatus through a network and for recording said media information on a detachable recording medium in said terminal apparatus, wherein said terminal apparatus serves as a transmitting terminal apparatus and also as a receiving terminal apparatus, said terminal apparatus comprises:

recording instruction means for designating specified media information to be recorded on said detachable recording medium and providing recording instructions concerning the recording of said designated specified media information, which recording instructions include a recording completion time at which the recording of said designated specified media information is to be completed, booking means for booking said recording completion time provided by said recording instruction means, monitoring means for monitoring whether or not there is detected a record idling time free of any recording operation to be conducted before a predetermined time prior to said recording completion time booked by said booking means is reached, and also for monitoring whether or not said predetermined time has been reached, media information downloading means for downloading said designated specified media information from said central apparatus to said terminal apparatus, and media information recording means for recording on said detachable recording medium said designated specified media information downloaded by said media information downloading means when said record idling time has been detected by said monitoring means or when said predetermined time has been reached, wherein said booking means is configured to make judgment on the feasibility of recording said specified media information by said recording completion time, when the booking of said recording completion time is requested through said booking means, and is also configured to indicate whether or not said booking can be accepted, based on said judgment made.

2. The media information distribution and recording system as claimed in claim 1, wherein said terminal apparatus further comprises media information storage means for storing said specified media information, and said media information downloading means is configured to download said designated specified media information either from said central apparatus or from said media information storage means.

* * * * *